(12) United States Patent
Rady

(10) Patent No.: US 9,583,140 B1
(45) Date of Patent: Feb. 28, 2017

(54) REAL-TIME PLAYBACK OF AN EDITED SEQUENCE OF REMOTE MEDIA AND THREE-DIMENSIONAL ASSETS

(71) Applicant: Bruce Rady, Batavia, IL (US)

(72) Inventor: Bruce Rady, Batavia, IL (US)

(73) Assignee: Bruce Rady, Batavia, IL (US)

( * ) Notice: Subject to any disclaimer, the term of this patent is extended or adjusted under 35 U.S.C. 154(b) by 0 days.

(21) Appl. No.: 14/876,590

(22) Filed: Oct. 6, 2015

(51) Int. Cl.
*G11B 27/031* (2006.01)
*G06T 13/20* (2011.01)
*H04N 21/222* (2011.01)
*H04N 21/44* (2011.01)
*H04N 21/472* (2011.01)
*H04N 21/426* (2011.01)

(52) U.S. Cl.
CPC ............ *G11B 27/031* (2013.01); *G06T 13/20* (2013.01); *H04N 21/222* (2013.01); *H04N 21/42653* (2013.01); *H04N 21/44004* (2013.01); *H04N 21/44016* (2013.01); *H04N 21/47205* (2013.01); *G06T 2200/04* (2013.01); *G06T 2200/24* (2013.01)

(58) Field of Classification Search
CPC ... G11B 27/031; G06T 13/20; G06T 2200/24; G06T 2200/04; H04N 21/44016; H04N 21/42653; H04N 21/44004; H04N 21/222; H04N 21/47205
USPC .................................................. 386/278–290
See application file for complete search history.

(56) References Cited

U.S. PATENT DOCUMENTS

| | | | | |
|---|---|---|---|---|
| 6,535,920 B1* | 3/2003 | Parry | ..................... | G11B 27/28 375/E7.011 |
| 8,285,886 B1* | 10/2012 | Vass | ........................ | G06F 3/165 710/15 |
| 8,914,836 B2* | 12/2014 | Shivadas | ................. | H04N 21/27 725/109 |
| 2007/0070890 A1* | 3/2007 | Rojahn | ............... | H04L 41/0896 370/229 |
| 2007/0234214 A1* | 10/2007 | Lovejoy | ............... | G11B 27/034 715/719 |
| 2008/0193100 A1* | 8/2008 | Baum | ................. | H04N 21/4825 386/281 |

(Continued)

*Primary Examiner* — Gelek W Topgyal
(74) *Attorney, Agent, or Firm* — Wong & Rees LLP; Karl T. Rees

(57) ABSTRACT

A video editing project includes multiple assets, such as animated three-dimensional geometries and streaming video clips. Assets are rendered during associated timespans in a timeline. Video clips are streamed from sources while the project is rendered, rather than in advance. Rendered video data is played in real-time during rendering. Rendering the project may further involve rendering assets in a three-dimensional space. Streaming video clip(s) may be mapped to a geometry. Effects or transformations may be applied the video clip(s) in real-time during rendering and playback. Non-destructive, non-linear editing techniques are described—edits are specified for assets without changing the assets at their sources or having to download and modify a working copy. The editor may support live editing of the project during the real-time playback. The video editor may be, for example, a web browser-based application requiring no direct software installation by the user, and streaming media from remote servers.

27 Claims, 11 Drawing Sheets

(56) References Cited

U.S. PATENT DOCUMENTS

| | | | |
|---|---|---|---|
| 2010/0262710 A1* | 10/2010 | Khatib | G06F 3/048 709/231 |
| 2012/0233555 A1* | 9/2012 | Psistakis | G06Q 10/101 715/751 |
| 2012/0284176 A1* | 11/2012 | Svendsen | H04N 5/76 705/39 |
| 2013/0007669 A1* | 1/2013 | Lu | G11B 27/034 715/848 |
| 2013/0275312 A1* | 10/2013 | Claman | G06Q 10/103 705/301 |

* cited by examiner

REAL-TIME PLAYBACK OF AN EDITED SEQUENCE OF REMOTE MEDIA AND THREE-DIMENSIONAL ASSETS

TECHNICAL FIELD

Embodiments relate generally to video editing, and, more specifically, to techniques for editing sequences of media and/or three-dimensional assets hosted in remote locations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

With the proliferation of smart phones, digital cameras, and other portable devices capable of capturing images and video, an ever-increasing amount of digital media data is being captured each year. Due to the limited storage capacities of portable devices, much of this media data is either quickly discarded or uploaded to cloud-based servers in largely unedited forms that are not ideal for sharing with others. Many cloud-based video services offer server-based editing tools for video uploaded to their systems, though these services are typically quite limited and require extensive computing resources such as large video rendering farms on the part of the video service provider.

Some consumers store their media data on personal storage servers. Utilizing high-power personal computing systems, such consumers may even edit their media data using any of a number of non-linear video editing software applications. However, many consumers find the process of editing their video data locally to be cumbersome, or lack a suitably-powered system for editing their media data, particularly if that media data is in a higher definition format.

Meanwhile, for power users who wish to create highly-customized media projects, most video editing software applications are limited to a small, canned set of special effects and animations. Those capable of higher-levels of customization are often difficult to use and limited to supporting locally stored media in only a handful of formats. Such tools may also require long rendering times to visualize effects, or large rendering farms to output video in a manageable amount of time.

Moreover, many video editing software applications lack the ability to easily share and reuse media data in the cloud. For instance, if a user wishes to create and share a video that includes clips from an Internet-based media stream, the media stream must typically be downloaded, processed, and re-encoded, which greatly increases the resources necessary to create and share the video.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
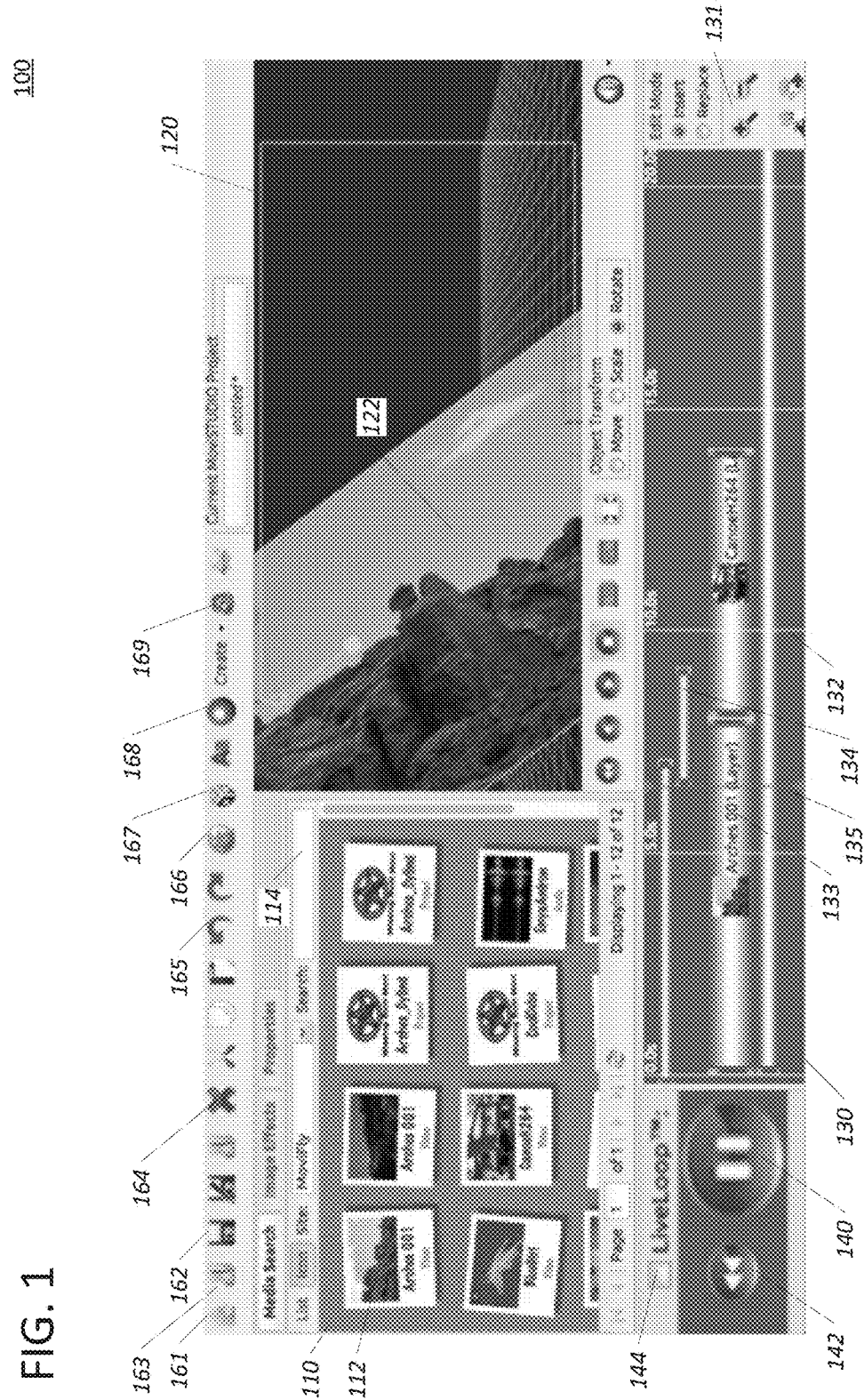
FIG. 1 illustrates an example interface for a video editing application.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   2.0. Video Production Environments
   2.1. Video Data
   2.2. Graphic Assets
   2.3. Video Editing
   2.4. Rendering a Project
   3.0. Structural Overview
   3.1. Clients
   3.2. Server System
   3.3. Third-Party Server
   3.4. Client-Side Application Components
   3.5. Browser-Based Implementation
   3.6. Browser-Specific Application Logic
   3.7. Miscellaneous
   4.0. Functional Examples
   4.1. Example Editing Flow
   4.2. Example Rendering Flow
   4.3. Example Animation Editing Flow
   4.4. Example Rendering of Animation
   4.5. Example Rendering of Texture-Mapped Streaming Video
   4.6. Example Browser-Based Scheduling Flow
   4.7. Example Proxy Server Flow
   5.0. Example Embodiments
   6.0. Implementation Mechanism—Hardware Overview
   7.0. Extensions and Alternatives

1.0. General Overview

Approaches, techniques, and mechanisms are disclosed for client-based editing and rendering of media projects in a cloud-based environment. According to one embodiment, a video rendering application receives project data that describes a media project. The media project is comprised of, among other elements, multiple assets identified by the project data. Assets may be of various types, including, without limitation, graphic assets such as animated three-dimensional geometries and media assets such as video and/or audio clips from streaming sources that stream data across one or more networks. A media project may itself be an asset—that is to say a project asset—that may be imported to and/or rendered in another media project.

The project data further associates the assets with timespans in a project timeline. The project data may further associate the assets with a variety of other data, such as spatial data, hierarchical data, rendering priority data, or animation data. Based on the project data, the video rendering application generates rendered video data in which the assets are rendered during their associated timespan. The rendered video data is generated while simultaneously streaming the video clip from the streaming video source and playing the rendered video data in real-time. The video clip and the graphical asset are rendered in the rendered video data at least partially concurrently.

In an embodiment, rendering the project comprises rendering the assets in a three-dimensional space. The project data describes spatial relationships between the assets, and those spatial relationships may change over time. The graphical asset may be an animated, three-dimensional model. The video clip is mapped to a geometry in the three-dimensional space, such as to an arbitrary surface of the graphical asset or to a plane, and rendered as a texture of that geometry as the video clip is playing. In an embodiment, rendering the project comprises seeking the video clip from the streaming video source to a timestamp specified by the project data and/or applying image effects to the video clip while it is being streamed from the streaming video source.

In an embodiment, a video editing application, which may include the video rendering application, includes graphical user interfaces for associating assets with timespans, modifying and animating properties of assets and optionally laying out and animating assets within a three-dimensional space to define and animate the spatial relationships. In an embodiment, the video editing application also or instead includes graphical user interfaces for specifying edits to the video clip, such as trimming operations or image effects, without changing the video clip at the streaming video source or having to download and modify a working copy of the video clip the video rendering application in advance. This is done in a non-destructive manner, allowing the edits to be changed or undone without affecting the original video/media. In an embodiment, the video editing application may further support live editing of the project data during playback of the rendered video data, such that edits are immediately viewable in the rendered video data without having to restart playback.

In an embodiment, the video rendering application is a browser-based application implemented by a web browser running purely in that web browser without requiring installation of any apps, toolbars, plugins, or other additional software. Using scheduling logic described herein, any arbitrary number of assets may be rendered by the browser-based application. Rendering the assets may comprise, for example, utilizing hardware-accelerated decoding of the video data, based on a HTML5 live video stream of the video clip, and/or utilizing hardware-accelerated processing of the graphical asset, based on WebGL instructions to draw the graphical asset. The web browser may be executed by any type of client device, including smartphones, tablets, desktop computers, set-top multimedia devices, and so forth.

According to an embodiment, a server system stores the project data and at least some of the assets. The server system may send the application code for the video rendering application to clients for execution—e.g. as HTML-based web pages or JavaScript application code. The streaming video source may be the server system, or a third-party server such as YouTube. The server system optionally provides a proxy server that filters and/or customizes the flow of a video stream of the video clip based on various factors described herein.

According to an embodiment, sequencing logic sequences the retrieval of assets from remote storage by intelligently pre-cueing and buffering assets from the remote storage. The sequencing logic looks ahead in an animated sequence for assets that need to be retrieved, and determines bitrates and playback times for those assets. The sequencing logic utilizes various metrics to determine how much each of the assets should be buffered at any given time based on predicted streaming data rates and seek times, so as to ensure continuous playback of the project and its edited sequence and animation as the project is rendering.

In other aspects, the invention encompasses computer apparatuses and computer-readable media configured to carry out the foregoing techniques.

2.0. Video Production Environments

Inventive techniques, apparatuses, and mechanisms are described herein within the context of computer-based video production environments. This section describes example aspects of some of these environments, according to various embodiments.

2.1. Video Data

As used herein, video data is data that describes a set of image frames intended for display in a sequence. An image frame is a two-dimensional array of pixels, each pixel having specified color attributes. One manner of classifying different segments of video data is by the sizes of the image frames they describe, with example classifications including standard definition (e.g. 720×480), high definition (e.g. 1920×1080 or "1080p"), and ultra-high definition (e.g. 3840×2160 or "4 k").

Raw video data refers to video data that specify color attributes for each pixel of each image frame. Compressed video data, on the other hand, need not specify color attributes for each pixel of each image frame, but may rather include data from which the attributes of each pixel may be calculated. Nor does each image frame need to be described individually. Rather, certain image frames may be described with respect to the differences between those image frames and other frame(s) in the video data.

Compressed video data may be represented according to any of a variety of encoding formats. Example encoding formats include, without limitation, H.264 or MPEG-4 Part 10 Advanced Video Coding, H.265, MPEG-1, MPEG-2, MPEG-4, Ogg-Theora, WMV, VP8, and VP9. A variety of container formats exist for storing encoded video data as data files or bitstreams. For instance, common containers include AVI, 3GP, MP4, MPEG-2 transport stream, Matroska, QuickTime File Format, WebM, and ASF. This disclosure is not limited to any particular format for encoding or storing video data.

Video editors and video playback software may include logic for decoding compressed video data stored in some or all of these formats. Such logic may also be referred to as a "codec." Video editors and video playback software may also or instead be configured to interface with decoder components provided by operating systems, external applications, and/or hardware that implement logic for decoding compressed video data in some or all of these formats. Once the compressed video data is decoded, the video data is in a raw or uncompressed format that may be manipulated, re-encoded, and/or driven directly to a memory such as a frame buffer from which the video data may be outputted to a display device.

A framerate is typically defined for a sequence of image frames, indicating how long each frame is intended to be displayed before being replaced by the next frame in the sequence. Example framerates include 30 frames per second, 60 frames per second, 29.97 frames per second, and so forth. However, the video data need not necessarily always be played at its intended framerate. Video data may instead be played at different playback rates. Playing video data at a playback rate that is slower than its intended framerate is typically referred to as slow-motion playback. Playing video data at a rate that is faster than its intended framerate is typically referred to as fast-forwarding. Since a display may only be capable of displaying a limited number of frames per second, the playing of video data at a rate that is faster than intended may involve skipping display of certain frames using various fast-forwarding algorithms. Since a viewer may not wish to view all video data in a particular video segment, portions of video data may typically be skipped using "seek" operations, that seek the video data to a specific timestamp, image frame, or byte range. Performing a seek operation is often not trivial, especially on remote storage, and the amount of time needed to complete it represents a delay that must be accounted for in many operations involving streaming media.

The amount of video data that exists for a given amount of playback time is referred to as the bitrate of the video data. The bitrate is typically stated in terms of bits or bytes per second, which is the number of bits or bytes stored within the video data to describe all of the frames that will be displayed in a second. Video data may have a constant bitrate, or a variable bitrate. In case of a variable bitrate, different time periods within the same segment of video data may have different bitrates. An average bitrate is the average amount of data stored per given unit of time over an entire segment of video data.

2.2. Graphic Assets

Techniques described herein may involve the rendering of graphic assets to generate video data. As used herein, a graphic asset is data structure describing a two or three dimensional object or collection of objects. Any physical object or collection of objects may be modeled—from cars, trees, and people, to cities and complex landscapes. The data structure includes a model, which is a mathematical representation of the appearance of described object(s) within a two-dimensional coordinate space (for two-dimensional objects) or three-dimensional coordinate space (for three-dimensional objects), depending on the dimensionality of the described object(s). The coordinate space relative to which the object(s) of an asset are described may also be referred to herein as the "object space."

A two-dimensional model may be, for example, a collection of vector graphics, defining vectors, such as lines or curves, that lead through control points having fixed positions within a two-dimensional space. Or, a two-dimensional model may be raster graphics, which describe objects in terms of a two-dimensional array of points such as a bitmap.

A three-dimensional model typically describes the object as a set of interconnected points known as vertices, having specified coordinates within the three-dimensional object space. The vertices are connected by geometrical entities referred to as surfaces, including, without limitation, triangles, polygons, lines, curved surfaces, and so forth. The surfaces may be shaded different colors and/or decorated with using processes such as texture mapping, height mapping, bump mapping, reflection mapping, and so forth. For instance, texture mapping refers to a process of mapping pixels described by a two-dimensional graphic or model to a surface of a three-dimensional object. Each surface may have its own texture. Alternative representations of three-dimensional objects may also be used, such as voxels.

Graphic assets may be generated in a wide variety of manners, including programmatically, through scanning or imaging mechanisms, and/or using animation, modeling, or computer-aided design software. Examples of the many suitable data structure formats for storing graphic assets include, without limitation, 3DS Max, Collada, Blender, Maya, and Mesh.

A model may optionally describe animations of an object. An animation describes how the object(s) change as the object(s) move in a particular way. For instance, a model of a human character may describe how the coordinates of the vertices change position over time as the human walks. For some graphic assets, only a single, fixed animation sequence may be defined for the asset, such as a short repetition of steps in a specific direction. For other graphic assets, the model may describe multiple ways in which the object may move, which may be utilized and combined programmatically to produce a wide range of animations. For instance, the model may describe an underlying skeleton with various control points. These control points may be movable, and the model may define how the movement of these control points deform a visible mesh placed on top of the skeleton.

A model may also optionally describe materials for an object. A material is a set of lighting parameters or coefficients that define how a lighting model interacts with surfaces of the object. In particular, ambient, diffuse, and specular coefficients for each color component (R,G,B) are defined and applied to a surface. These are effectively multiplied by the amount of light of each kind/color that strikes the surface. A final emissivity coefficient may be added to each color component that allows objects to appear luminous without necessarily interacting with other objects. An alpha channel may also be present to control the transparency of an object.

Rendering a graphic asset refers to the process of converting the model to a two-dimensional image. The rendering process typically involves a projection operation, which determines how to the modeled object(s) would appear as a two-dimensional image from a defined perspective. For instance, a three-dimensional graphic asset is projected from a three-dimensional object space to a two-dimensional "screen" space. The rendering process may also involve lighting operations, which simulate how light from different light sources placed at various positions relative to the described object(s) would affect the appearance(s) of those object(s). A graphic asset may define light sources, and/or light sources may be defined outside of the graphic asset. These light sources constitute a lighting model. A graphic asset may also define or references algorithms known as shaders that are to be applied to the model during rendering at the vertex, geometry, and other levels. The shaders may implement the lighting model and/or a generate a variety of other effects through processes such as manipulating the colors of various elements of the model or adding new vertices or geometries to the model. A number of other operations may also be performed during the rendering of an asset.

Graphic assets may be laid out in a scene, which describes spatial relationships between the graphic assets, including location and size. For scenes involving three-dimensional objects, the scene is a three-dimensional space, often referred to as a "world space" or "scene space," and each asset is said to belong to a particular position in this space. Two-dimensional graphic assets may also be placed within a three-dimensional world space by mapping the graphic assets to planes or other geometries.

Animations may also be defined relative to the three-dimensional world space. For instance, an asset that depicts a car may be defined as moving from one end to another end. Animations may further be defined for non-spatial properties. In other words, the appearance of an object may change over time without the object necessarily changing shape or positions. For instance, the blur strength of a filter may be defined such that a blur effect applied to an object changes over time, or the cone angle of a spotlight on a scene may expand over time. Other animations may occur, for example, on account of changes to the lighting model or field-of-view of the camera from which the scene is being rendered.

Once laid out, the entire scene may be rendered. Each asset within the scene is rendered as it would appear in two-dimensions from a viewpoint defined for the scene, taking into account the spatial layouts of all of the other graphic assets in the scene as well as the properties of the virtual camera. For three-dimensional scenes, this process may be viewed as involving four steps: (1) rendering each texture of each graphical asset in a two-dimensional texture space, including applying any filters (or image effects) to those textures animated at the current time; (2) rendering those textures within their respective three-dimensional object spaces through mapping and/or parameterization; (3) rendering the graphic assets within the three-dimensional world space using translation, rotations, and other transformations; and (4) projecting the scene on to a two-dimensional screen space from a particular viewpoint within the world space (ie, the virtual camera).

When animation(s) of the assets have been defined relative to a two-dimensional or three-dimensional space, or when individual graphic assets are animated, this rendering is performed for each of a series of points in time, thus producing a sequence of image frames which may utilized as video data. Each rendered image frame is in essence a new scene, reflecting changes over time to the appearances and/or spatial layouts of the assets. Note that not all of the foregoing steps need be repeated when each image frame is rendered. For instances, textures or graphic assets that do not change need not be re-rendered for each image frame.

Rendering may be performed using a variety of software and/or hardware components. Computing devices often comprise one or more graphics processor units (GPUs) optimized to perform some or all of the rendering. Rendering performed by a GPU is considered to be hardware-accelerated rendering. A computing device may also or instead provide software-based rendering through operating system components and/or device drivers. Applications installed on a computing device can typically request that the GPUs and/or software-based renderers perform rendering operations through Application Programming Interfaces (APIs) exposed by graphics libraries such as Direct3D, Open Graphics Library (OpenGL), WebGL, and Vulkan.

2.3. Video Editing

According to embodiment, the techniques described herein involve the use of video editors for generating and outputting video data based on inputted assets such as described above. The assets may include, without limitation, segment(s) ("clips") of video data, image data, audio data, other multimedia data, text, and/or graphic assets. Generally speaking, a video editor is an application that permits users to identify assets as input(s), specify arrangement(s) and/or manipulation(s) of the inputted video data, and output video data that applies the specified arrangement(s) and manipulation(s).

Projects

A given set of inputs and specified arrangement(s) and manipulation(s) is referred to as a project. Project data describing the project is typically stored as one or more files or database records. For instance, in one embodiment, the project data is stored as a JavaScript Object Notation (JSON) file.

Generally, the project data specifies a number of assets that are in the project, typically by reference to location(s) where the asset data are stored (though in some embodiments asset data may in fact be stored within the project data). The project data may also store various metadata describing an asset may also be stored, such as an asset type, asset length, asset size, asset bitrate, edit(s) specified for the asset, temporal location of the asset in the project, spatial location in a scene, project-specified animation data, and so forth.

A project is further considered to have a timeline consisting of a plurality of timestamps. The project data further specifies temporal relationships between the assets relative to the timeline. For instance, the specified temporal relationships may indicate that one asset is to appear before another, partially at the same time as another, and so forth. The specified temporal relationships indicate when an asset is to appear and a duration of time for which the asset is to appear—in other words, a timespan—relative to the timeline.

A video editor is typically a non-linear video editor. The video editor includes interface controls for importing video clips, graphic assets, and other assets into the project, either by reference or directly. The video editor may further include interface controls for associating these imported assets with different timespans, such as drag and drop controls for placing the items on specific portions of a visual representation of the project timeline, thus defining the temporal relationships between the assets. The video editor may further include controls for specifying manipulations with respect to various aspects of these items, such as controls for trimming clips or applying image effects such as blurs or color corrections.

According to an embodiment, the project data optionally describes spatial relationships between the assets within a two-dimensional or three-dimensional world space, which may also be referred to herein as the project space (as opposed to the object spaces). The project data may associate each asset with specific coordinates within a two-dimensional or three-dimensional coordinate system. The video editor may further include controls for editing and defining animations for these assets, by which the spatial properties of, and relationships between, concurrently presented assets may change over time. The interface controls may further allow a user to specify lighting sources and image effects to apply to specific assets or to the project as a whole.

The interface controls may allow a user to define a viewpoint from which the project space may be rendered, relative to the coordinate system of the project space, such as scrolling controls, panning controls, and/or rotation controls. The video editor may further include controls for defining animations for these assets, by which the spatial relationships between concurrently presented assets may change over time. The interface controls may further allow a user to specify lighting sources and image effects to apply to the project.

For three-dimensional project spaces, the interface controls may allow a user to drag and drop video clips and other two-dimensional assets within the space as two-dimensional shapes, such as planes. These shapes may be rendered from any arbitrary perspective, just as any other asset. The imported video will be played on the shape, as a texture, over time. Thus, for instance, a video editor may allow a user to specify that a video should be rendered as if being viewed on a screen from an angle rather than directly on-point.

The interface controls may also allow a user to drag and drop assets, including media assets such as video clips, on to certain surfaces of graphical assets, so as to cause the assets to be utilized as textures for the graphical assets. Such surfaces may be referred to as media surfaces. A graphical asset may designate certain surfaces as being media surfaces, capable of receiving media assets that will be played to those surfaces. For instance, one graphic asset may model a three-dimensional book, such as a photo album, under the light of a lamp. Different surfaces of the book might represent different photograph frames within the photo album, and be capable of accepting video clips as inputs. When rendered, the video clips would appear to be moving pictures in the book, contoured to the surfaces of the pages. Lighting from the lamp and other visual effects applied to the book may also be applied to the video clips.

According to an embodiment, a project may itself be an asset. Assets, lighting, viewpoints, and any other project data from one project may be imported into another project in a number of ways. For instance, the project may be imported as a single atomic graphic asset. Or, all of the assets and project data within a project may be imported in such a manner that a user may modify the spatial and temporal relations between those assets (i.e., merge one project into another). In an embodiment, the project data for each project may be stored in a graph-like structure to simplify integration of a project into another project. In an embodiment, a graphic asset is stored in the same format as a project—in other words, a project is synonymous with a graphic asset.

In an embodiment, an entire project asset may be texture mapped to a surface of a geometry, in the same manner that video clips may be rendered to the surface. In other words, an embedded project asset may be rendered as video data which is played to the surface of an object within the project in which the embedded project asset has been embedded. Image filters and other effects may be applied to the rendered project using any suitable texture mapping techniques.

Example Interface

FIG. 1 illustrates an example interface 100 for a video editing application, according to an embodiment. The depicted interface 100 permits the editing of a project. Interface 100 comprises an asset library 110 from which asset icons 112 may be selected. Asset icons 112 correspond to individual assets that may be imported into the project by dragging and dropping the assets onto stage area 120 and/or timeline area 130. An asset library search bar 114 permits searching for new assets. Timeline area 130 presents a timeline view of the project over a period of time that is controllable via zoom controls 131. Specific points in time are depicted as gridlines 132. The assets that have been imported into the project are represented as asset markers 133.

The position of an asset marker 133 within the timeline area 130 relative to gridlines 132 indicates a timespan in which the asset will appear in the video data output for the project, including both a start time when the corresponding asset will first be rendered and an end time when rendering of the corresponding asset will cease. The timespans of different asset markers 133 may at least partially overlap. In an embodiment, there may be no limit to the number of assets that are presented concurrently. The timespans during which assets are rendered may be moved through various input, such as drag and drop operations on asset markers 133. The timespan of an asset may also be shortened or lengthened by moving the boundary of its asset marker 133. A progress indicator 135 indicates a current timeline position, relative to gridlines 132, that is being depicted in stage area 120.

Interface 100 further includes a play button control 140 that a user may select to instruct a video renderer to begin rendering the project. For instance, the project may be rendered to a video file and/or for display in stage area 120. The position of progress indicator 135 may change as the project is being played and/or rendered. Interface 100 may optionally further include one or more trick-play control buttons 142 that a user may select to control the playback of rendered video data through trick-play operations such as fast-forwarding, rewinding, pausing, changing the playback speed, and so forth. Interface 100 may further include an optional loop control 144 that, when selected, instructs the video renderer to limit playback to a specified timespan within the project, as indicated by timespan 134 in timeline area 130. When loop control 144 is enabled, playback will repeatedly loop over this specified timespan.

Stage area 120 optionally permits a user to lay out imported assets within a three-dimensional project space. Graphics 122 within the stage area 120 represent imported assets, along with their corresponding attributes and transformations, including sizes, positions, rotations and appearances. Graphics 122 may be moved and/or rotated relative to each other through a variety of inputs, such as drag-and-drop operations, thereby changing the spatial layout of the assets within the space. In one embodiment, an asset may be animated by placing its corresponding graphic 122 in a first position at a first time in the timeline, moving the progress indicator 135 to a second time in the timeline, and moving the graphic 122 to a second position in the timeline. The asset may be rendered within the space over time as gradually moving from the first position at the first time to the second position at the second time by calculating interpolated transformations at each time. The stage area 120 may further include zoom, panning, and rotation controls for changing the perspective from which the space is viewed and rendered.

In an embodiment, the interface 100 may further include controls for specifying various manipulations for the imported assets. For instance, a right-click on an asset marker 133 or graphic 122 may bring up a menu of various options for changing the presentation of its corresponding asset, such as options for resizing the asset relative to the space, trimming or dividing a video clip, changing a color, applying certain specified effects, and so forth. The stage area 120 may also include controls for specifying certain attributes that are relevant to how the space will be rendered, such as lighting positions, shading algorithms, and so forth.

Interface 100 further includes various controls for performing actions relative to the project as a whole, including a new project button 161 for starting a new project, a save button 162 for saving the project, an open button 163 for loading a previously saved project, a delete button 164 for deleting assets that are currently selected within interface 100, an undo button 165 for undoing a previously-performed operation, an upload button 166 for uploading new assets to a server, a texture button 167 for specifying textures to associate with surfaces of imported graphic assets, a model import or creation button 168 for opening or directly creating new models and other scene elements to add to the stage area 120, and a preferences button 169 for launching a menu for changing project or application configuration attributes.

A video editor may of course feature a variety of other interface controls for defining a project. The examples given in FIG. 1 and throughout this section are given solely as examples of functionality that may be provided by a video editor. Interfaces in other embodiments may include fewer or additional controls, arranged in a variety of different manners.

2.4. Rendering a Project

A video rendering component is typically included or utilized by a video editor to render the project. Rendering the project refers to the act of applying specified arrangement(s) and manipulation(s) defined by a project to produce video data. More specifically, rendering involves generating video data for the timeline described by the project, in which assets specified by the project are rendered at times indicated by temporal relationships specified by the project, and optionally in which the assets are depicted as being laid out within a two-dimensional or three-dimensional project space according to spatial relationships specified by the project.

The rendering typically produces video data of some kind. However, the manner in which that video data is output may differ, depending on the embodiment and selected rendering options. Rendering options may include, for instance, a video quality, image frame size, bitrate, framerate, and so forth. A project may be rendered to a file, in which case the video data is saved to a data structure from which it may be played back by a video player at a later data. A project may also or instead be rendered directly to a display.

The rendering may further produce, depending on the project, audio data rendered based on various media assets that include audio elements. It will be understood that any video data described herein, including both video data streamed from video sources and video data rendered for a project, may be accompanied by audio data, such as one or more tracks of audio data that are synchronized to the video data. Moreover, standalone audio files may also be included in or rendered from a project.

In some embodiments, including at least one web browser-based embodiment, the video editing and rendering applications described herein support both a non-real-time rendering mode that outputs a project directly to a file, and a real-time playback of a project as the project is being rendered on the client side, which may render the project more quickly, though potentially at a lower quality. Different interface controls may allow a user to select between the rendering modes. The non-real-time rendering may be performed on the client-side, or on the server-side, depending on the embodiment. In an embodiment, the non-real-time rendering may be a frame accurate rendering, whereas the real-time rendering may not be entirely frame-accurate, in that a variety of shortcuts such as skipping frames or partial renderings may be utilized to ensure that the project is rendered quickly enough to be played in real-time. However, in other embodiments, even the real-time rendering may be frame accurate. In an embodiment, the non-real-time rendering may use higher quality versions of assets to produce video data of higher image and/or audio quality.

The rendering typically involves generating a plurality of image frames (including audio data samples) for the outputted video data, each image frame corresponding to a different timestamp within the timeline of the project. Generating each outputted image frame may involve a variety of computational tasks. For instance, the scene depicted by each image frame may be different on account of the temporal relationships between the project's assets, changes in the spatial relationships between those assets within the project space over time, animations defined by any of the assets that are graphic assets, image frames within any embedded video assets, changes in the viewpoint from which the project space is viewed, changes in the audio characteristics of the project, and so forth. Thus, generating each new image frame may involve identifying or calculating the spatial layout of a new scene of the assets within the project, and rendering that scene. The generating of a new image frame may in some embodiments be optimized so as to recognize when the appearance(s) of certain asset(s) or portions of the scene do not change between image frames, and re-using previous renderings of those assets within the scene rather than repeating the rendering of those assets.

A video rendering component may also be utilized in software applications that do not necessarily allow for video editing. Any application that utilizes a video rendering component to render a project, including a video editor, may be referred to as a video renderer. For convenience, most of the embodiments describe the rendering of a project as being performed by a video editor that includes a video rendering component. However, it should be understood that the described rendering steps may instead be performed by any suitable video rendering application, regardless of whether the video renderer offers editing capabilities.

"Real-time rendering" or "real-time playback" refers to the rendering of project directly to a display in such a manner that the outputted video data is played at, or close to, its intended framerate while the project is actually being rendered. A video renderer may employ some amount of buffering to achieve real-time playback, for example, where a certain number of image frames are rendered or retrieved in advance of the currently playing frame and stored in a temporary high speed memory referred to as a buffer. The buffering ensures that playback remains smooth even if the rate of rendering individual frames is sometimes less than the intended frame rate. However, for all but very short projects, the concept of real-time playback requires that the buffer be significantly smaller than the size of the entire rendered project, so that the delay between a user requesting playback or seek operations and the performance of those operations is minimal. For instance, in one embodiment, an appropriate amount of buffering for real-time playback might be five seconds worth of video data or less.

To achieve real-time-playback, a video renderer may be configured to take various actions that reduce the quality of the outputted video data, including rendering lower quality versions of graphic assets, using lower quality special effects, requesting and/or displaying lower quality versions of media assets, dropping less visible assets from view, and so forth.

3.0. Structural Overview

Figure 2:
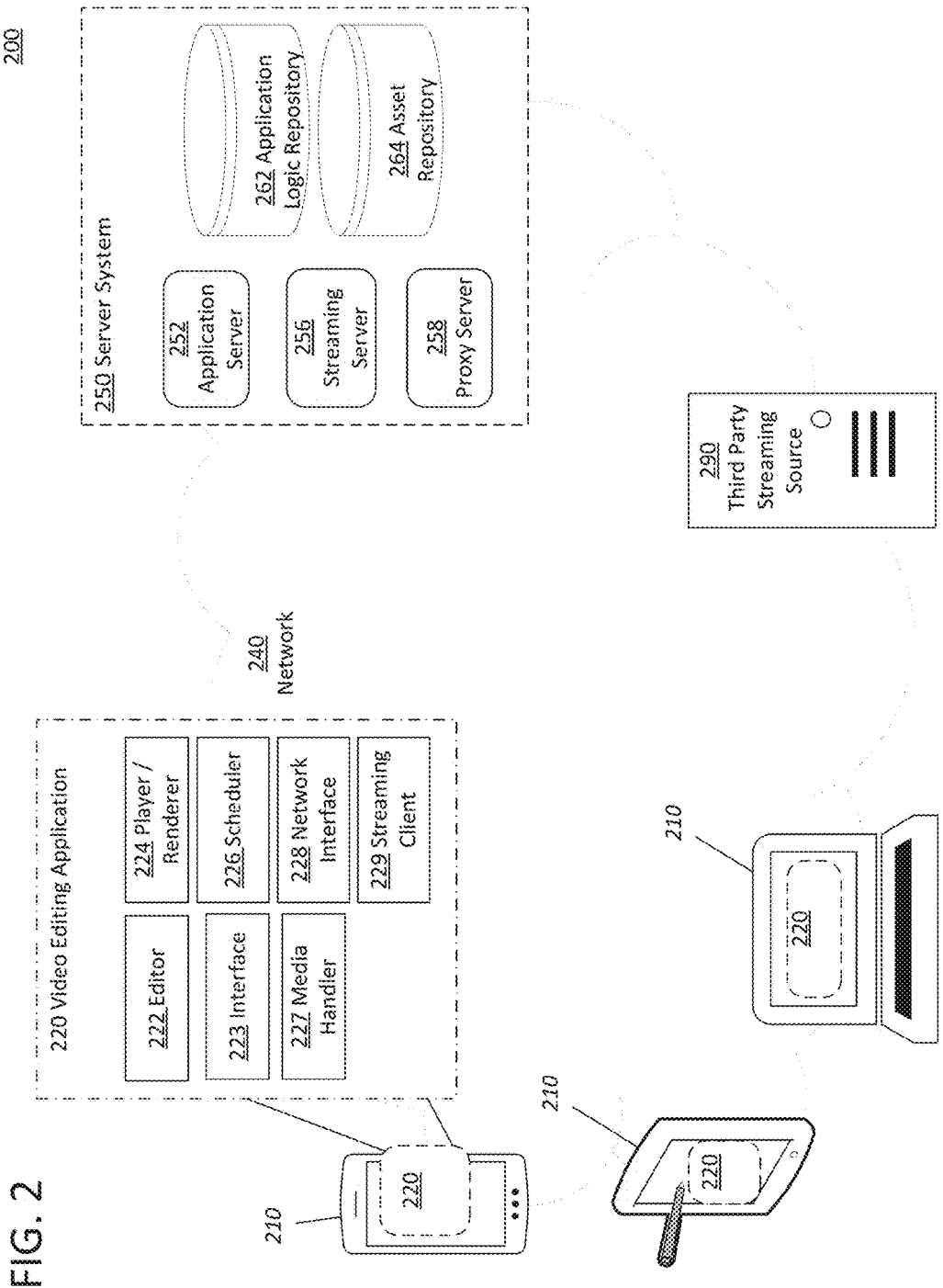
FIG. 2 is an illustrative view of various aspects of an example system in which the techniques described herein may be practiced.

FIG. 2 is an illustrative view of various aspects of an example system 200 in which the techniques described herein may be practiced, according to an embodiment. System 200 comprises one or more computing devices. These one or more computing devices comprise any combination of hardware and software configured to implement the various logical components described herein, including components 210-290. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

3.1. Clients

System 200 comprises multiple client devices 210. A client device may also be referred to herein as simply a client. A client 210 is a standalone computing device, such as, without limitation, a desktop personal computer, laptop, tablet, smartphone, personal digital assistant, gaming console, set-top box, or multimedia device. A client 210 comprises computing hardware, such as one or more processors, configured to implement a video editing application 220 for editing video data. Although three clients 210 are depicted, there may in fact be any number of clients 210 in system 200.

A video editing application 220 may be a video editor, such as described in the previous section. A video editor 220 may more specifically be implemented, for example, by one or more processors executing one or more processes that implement software-based instructions for generating and editing video data. In an embodiment, the software-based instructions take the form of web pages and/or server-based scripts that are executed by a web browser or browser engine component of a client 210. In other embodiments, the software-based instructions may also or instead take the form of compiled code or bytecode that is installed on each client 210, such as code for a desktop application or mobile application. The software-based instructions may be platform independent. Or, separate versions of the software-based instructions may exist for different types of clients 210 or clients 210 that run different types of operating systems.

In some embodiments, different versions of the video editor 220, having different capabilities, may be executed on different clients 210. For instance, there may be free or lower-priced versions of video editor 220 permitting only a subset of the functionality permitted by higher-priced versions. Or, certain clients 210 may execute a thin-client version of video editor 220 (e.g. a web-based version) that is more limited in functionality than a thick-client version that is downloaded and installed from an application store. In some embodiments, the video "editor" 220 on certain clients may only be capable of rendering projects created by fuller-featured video editors 220 on other clients 210. In other words, one version of video editor 220 may in fact simply be a real-time rendering web application or other application intended to allow a user to play projects created by other versions of video editor 220, but not to create or edit projects.

In certain embodiments, some functions of the client video editor 220 may actually be performed at the server system 250 described below.

3.2. Server System

System 200 further comprises a server system 250 coupled to clients 210 by one or more networks 240, such as the Internet. Server system 250 provides cloud-based services to clients 210. Server system 250 may be, for instance, a server farm, a cluster of computers, a collection of virtual servers, or any other set of one or more computing devices that collectively provide the services described herein. The cloud-based services provided by server system 250 include a variety of services to support the operation of video editors 220. The services may include, for example, video and asset hosting, streaming, processing, and/or rendering, as described in subsequent sections.

Application Server

For example, server system 250 may comprise one or more application logic repositories 262 storing application logic executable by clients 210 to implement various functionality of video editors 220. As used herein, a repository may include one or more databases, file systems, or other mechanisms for storing electronic data. The application logic may be embodied in a variety of forms, depending on the embodiment. For instance, the application logic may include one or more web pages, scripts or other interpreted code, compiled code, bytecode, and/or any other suitable form of instructions.

Server system 250 may further comprise one or more application servers 252 coupled to application logic repository 262, via which clients 210 may access and download the application logic stored therein. An application server 252 may be, for instance, a generic web server or file server, or a specialized application server. The application logic may be downloaded by a client 210 entirely at once (e.g. in the case of downloading an installable application), or over a series of requests and responses (e.g. in the case of a web application). The entire application logic need not be downloaded in advance of executing the video editor 220. Rather, instructions for certain features may only be downloaded when they are actually needed. For instance, a client 210 may be configured to request specific scripts or web pages that embody logic for presenting certain menus or interface controls only when a user actually requests those controls. The application server 252 may, in some embodiments, generate portions of the application logic dynamically, based on various characteristics of a client 210 and/or a context in response to which a request from the client 210 is received.

Asset Repositories

Server system 250 may further comprise one or more asset repositories 264 configured to store asset data describing assets, including graphic assets, projects, and media data. The media data may include video data as described herein, as well as image data and audio data, depending on the embodiment. There may be separate asset repositories 264 for different types of assets, or all asset types may be found in a single repository 264. In some embodiments, there may furthermore be separate asset repositories 264 for different users, groups of users, categories of assets, and so forth.

An asset repository 264 may further store metadata describing each asset stored therein. For each asset, the metadata may include, without limitation, a title, description, preview image(s), ownership data, licensing information, and one or more categories of genres. Moreover, in some embodiments, a number of versions of each asset may be stored in asset repository 264 for different contexts, such as different target platforms, different streaming bitrates, and so forth. For instance, there may be both a high-definition version and a low-definition version of each item of media content. The metadata may describe which versions of the asset exist, and where the version may be found.

An application server 252 may be coupled to asset repository 264 and configured to send various metadata from asset repository 264 to clients 220. The application server 252 may send data and/or application logic to the clients 210 that allow the clients 210 to browse asset repository 264 as a library, folder structure, or search asset repository 264 as searchable database. For instance, the application server 252 may send a form or other code to client 210 that causes the client 210 to present the asset library 110 portion of the example interface 100.

A client 210 may request assets of interest from the application server 252, either directly in response to a user having selected the asset from the library, folder structure, or searchable database, or at some point during or prior to rendering a project into which the asset has been imported (e.g. by selecting the asset in the library, folder structure, or searchable database). For instance, a client 210 may download and open a project file saved in an asset repository 264 via application server 252. As another example, in response to a request to render a project, a client 210 may request an asset 252 that needs to be rendered in the project from application server 252. Depending on the embodiment, the application server 252 may send the requested asset to client 210 as a downloadable file, or the application server 252 may redirect client 210 to a streaming server 256 that streams the data for the requested asset to client 210.

The assets stored in the one or more asset repositories 264 may include assets uploaded by clients 210 or other computing devices, assets created by an owner of server system 250, and/or assets downloaded and licensed from other repositories. In an embodiment, an application server 252 may further be configured to receive asset data from clients 210 or other sources over network 240, and store the received asset data in asset repository 264. As another example, video editors 220 may be configured to save and upload project files created at clients 210 to application server 252 for storage in an asset repository 262. As another example, certain clients 210 may be configured to capture (e.g. with a camera) or otherwise store video data or images. Video editors 220 or other software on clients 210 may then be configured to upload the video data or images to asset repository 264. As yet another example, certain clients 210 may be configured to upload graphic assets created by scanning real-life objects with one or more sensors at the clients 210, and/or graphic assets created or modified by modeling or animation software stored thereon. In at least one embodiment, a video editor 220 may include interfaces for creating or manipulating a graphic asset.

Uploaded content may be stored, at least temporarily, in the form it was uploaded. Uploaded assets may undergo pre-defined or user requested processing by the application server 252, such as conversion, compression, correction, optimization, or other operations. The application server 252 may store the processed content as a new version that co-exists with the original content in the asset repository, or the processed content may be saved over the originally uploaded content. For instance, application server 252 may automatically create different versions of any uploaded video clip for different target contexts. Application server 252 may also process uploaded assets to generate certain metadata. For instance, a preview clip may be created for certain graphic assets or video clips. According to an embodiment, graphic assets are all converted to a common format for downloading to clients 210.

In certain embodiments, the operations described in this paragraph above can also be performed by the client-side video editor 220, including conversion, compression, transcoding, correction, optimization, and other operations. These embodiments may include, for instance, certain embodiments where the video editor 220 runs strictly in a web browser.

In some embodiments, at least some of the assets in asset repository 264 may be shared between different clients 210. For instance, a client 210 may upload a video clip and mark the clip as shareable with all other clients 210 or with certain users or groups of users. Any user with whom the content has been shared may see the content in a library, directory, or search interface when the user is logged into a client 210. In other embodiments, clients 210 may only see contents that have been uploaded in association with a user that is currently logged in to the client 210.

In an embodiment, assets may be designated as being for purchase. For instance, an animator may upload graphic assets to asset repository 264 and specify that the graphic assets be made available to any user who purchases a license to the content for a specified price. A preview of the graphic asset may furthermore be made available. An application server 252 may be configured to conduct transactions with clients 210 that request to purchase a license to the graphic asset. Server system 250 may be configured to send the full graphic asset only to clients 210 associated with user accounts to which the graphic asset has been licensed. Any asset may be made available for purchase, including graphic assets, media assets, and project assets.

In another embodiment, server system 250 may be configured to generate video data to store in server system 250 from projects created in video editors 220.

Streaming Server

Server system 250 may further comprise one or more streaming servers 256 configured to stream video data and/or other assets in the one or more repositories 264 to clients 210. As used herein, the act of streaming refers to the sending of sequences of data elements, possibly including only select timespans or portion, from an asset over time, rather than in a batch, in such a manner than the data elements may be utilized immediately upon reception rather than having to wait for the entire asset. For instance, the streaming of video data may involve the sending of image frames or data representing groups of image frames from the video data in an order in which the frames or groups are played, so that corresponding portions of the video data may be played immediately upon reception rather than waiting for the entire video data to be transmitted.

Video data or other data may be streamed from a source, such as a streaming server 256, to a destination, such as a client 210. A bitstream, or simply "stream," of the data is delivered from a streaming server 256 to a streaming client 210 using a transport protocol, such as Microsoft Media Server (MMS) or Real-Time Transport Protocol (RTP). As an alternative to using proprietary transport protocols, in an embodiment, streaming server 256 streams assets over the Hyper-Text Transport Protocol (HTTP) using technologies such as HTTP Live Streaming (HLS), Microsoft's Smooth Streaming, Adobe's HDS, or Dynamic Adaptive Streaming over HTTP (DASH).

In an embodiment, the type and/or size of an asset is used by a client 210 or server system 250 to determine whether to send an asset as a download from application server 252 or as a stream of data from streaming server 256.

In an embodiment, streaming server 256 may be configured to process instructions from a streaming client 210 using a control protocol, such as MMS or Real Time Streaming Protocol (RTSP). Such instructions may include, without limitation, instructions to request new image frames, skip a number of image frames, seek to a specific enumerated image frame or associated timestamp, or stream video data at a seek rate that is different than its playback rate. For instance, streaming server 256 may be configured to respond to a request for a specific byte range of a stream by seeking to the specified byte range and beginning streaming from that byte range.

In an embodiment, certain types of streaming clients 210 may be configured to continuously request and cache a video stream until a streaming server 256 indicates that there is no more data in the stream, even if the rest of the stream is not needed by the client 210. Most conventional streaming servers are nonetheless configured to always accurately report how much data remains in the stream. The streaming server 256, by contrast, may further be configured to respond to a request for a specific amount of data in the stream by sending only that amount of data, and reporting that there is no more data left in the stream, even if there is in fact more data left in the stream.

In an embodiment, streaming server 256 may be configured to transcode certain media data if requested by a streaming client 210. For instance, a streaming client 210 may request media data in a certain format or bitrate version that is not stored in the asset repository 264. Streaming server 256 may thus transcode the media data and optionally store the transcoded content as a new version of the corresponding media asset.

Although depicted as logically separate from application server 252, in some embodiments an application server 252 and streaming server 256 may both be components of a same server, such as a web application framework.

Proxy Server

Server system 250 may further comprise one or more proxy servers 258 that perform a variety of tasks, such as filtering or performing intermediate processing of streams sent by streaming server 256 or other sources. In an embodiment, cross-domain security restrictions that limit the sources from which assets may be streamed are enforced by certain video editors 220 (e.g. browser-based implementations). To work around these restrictions, clients 210 may request certain contents hosted by third-party sources via a proxy server 258 rather than the third-party source. The proxy server requests and retrieves the assets, and then responds to the clients 210 with the data the proxy server received.

Other examples of functions that may be provided by a proxy server 258 are described in other sections.

Miscellaneous

Though many of the techniques are described with respect to embodiments that include a server system 250, some of the techniques described herein may nonetheless be practiced in embodiments that do not include certain features of server system 250. For instance, one or more of the application server(s) 252, streaming server(s) 256, or proxy server(s) 258 may not be necessary in certain embodiments. In yet other embodiments, no server system 250 is required at all. That is, some of the inventive techniques described herein can be performed entirely using components at clients 210, without the support of server system 250.

3.3. Third-Party Server

System 200 may optionally further comprise one or more third-party servers 290 from which clients 210 may obtain content. The one or more third-party servers 290 may provide access to any type(s) of assets. For example, one third-party server 290 may be a video streaming server such as YouTube. In an embodiment, content streams from such third-party servers may be utilized by video editors 220 in the same projects as assets from the one or more asset repositories 264, without the content streams necessarily being downloaded by, processed by, or even routed through server system 250. The third-party servers 290 may include streaming components, with some or all of the features of streaming server 256, and/or file servers or web servers from which assets may be downloaded.

Also, third-party servers 290 may also include searching, filtering, and metadata processing such as previously described for asset repository 264. In such embodiments, video editors 220 may also be configured to take advantage of this functionality through any suitable API.

3.4. Client-Side Application Components

Video editors 220 may comprise a variety of components, depending on the embodiment. These components may include, among others, an editor component 222 configured with project creation and editing logic such as described in other sections, interface components 223 such as described in other sections, a video rendering and/or playback component 224 such as described in other sections, and one or more media handlers 227 such as described in other sections. A video editor may also include a network interface component 228 configured to send data to or request data from server system 250 over the one or more networks 240.

In an embodiment, the editor component 222, interface components 223, and video rendering components 224 are coupled together in such a manner as to allow for editing of the project data while the project is being rendered and played in real-time, thus allowing users to see the effects of their edits immediately after making them. For instance, the project may be rendered to a stage area of the video editor GUI. A user may drag and drop representations of assets into the stage area or a timeline area, or move such representations around, as the project is being played, thereby editing various aspects of the project. Or the user may update options in a menu that affect attributes of the assets as the project is being played. The editor component 222 immediately updates the project data to reflect the change. Any newly added asset is requested from the server system 250, if necessary, and the renderer 224 begins rendering the asset as part of the project as soon as enough asset data has been received. Any changed asset attributes or scene layout changes are rendered immediately with those changes.

In an embodiment, using interface components 223, a looping timespan within the project timeline may defined. Rendering of the project may be looped through this timespan repeatedly as edits are received, to allow the user to more quickly see the effect of changes on a specific timespan in the project.

Scheduler

According to an embodiment, in order to optimize the rendering of a project for real-time playback of assets from server system 250, video editor 220 includes a scheduler component 226. Scheduler component 226 identifies assets needed for rendering a project, and determines when to request the identified assets from server system 250 relative to a timeframe in which the rendering component 224 is rendering the project. In general, scheduler 226 optimizes the retrieval of assets from server system 250 and storage of those assets at a client 210 so as to ensure that the renderer 224 can render the project efficiently enough to provide real-time playback of the project.

The scheduler 226 may schedule the retrieval of assets based on a wide variety of factors, including the temporal location assigned to the currently playing asset in the project, the temporal locations and timespans assigned to other assets in the project, seek times for media assets, the sizes, bitrates and encoding attributes of the assets in the project, a currently observed or history of observed bandwidths over network 240 between client(s) 210 and server system 250, memory constraints, processing constraints, and so forth.

Some of the most common factors considered by scheduler 226 when scheduling an asset are the bitrate of the asset, the duration of the asset, and the predicted streaming rate of the asset. Generally, the scheduler 226 schedules the asset for retrieval at a time such that, if the asset is streamed at the predicted streaming rate, enough asset data will be stored in asset cache 364 by the time the asset is ready to be played to continuously sustain playback of the asset until the timespan of the asset has been completely played. The scheduler 226 may be configured to add some default additional buffer time for retrieving the asset as well.

The scheduler 226 may also be configured to take into account external considerations, such as the bitrates and durations of other assets in the project, the predicted streaming rates of those assets, a maximum total bandwidth for the client 300, and so forth. Moreover, since the number of assets visible in the project at different times may vary, the amount of bandwidth available for streaming an asset may change over time, thus affecting its predicted streaming rate. The scheduler may also take such a consideration into account when scheduling the retrieval of an asset.

The actual streaming rate will be a function of a number of factors, such as network topology, network traffic, server hardware and software, client hardware and software, and so forth. A variety of metrics may be utilized to approximate the effect of these factors on the streaming rate, and thus estimate a predicted streaming rate.

According to an embodiment, application logic 220 is configured to track the amount of time between requesting a portion of media data for an asset from the server and successfully rendering that portion of the media data. From this information, scheduler 226 may be configured to calculate an actual streaming rate. Application logic 220 may log the calculated actual streaming rates over time for the server and/or asset. The predicted streaming rate of an asset may be a function of the average of the logged actual streaming rates for the asset and/or for the server from which the asset is to be retrieved. The average may be weighted over time, such that more recently logged streaming rates are weighted more heavily. The average may also or instead be weighted to particular contexts, so as to weight more heavily actual streaming rates logged during the current time of day, during the current day of the week, while the client 210 was in a similar network location, or while the client 210 was concurrently performing similar tasks. A standard deviation may be calculated for the actual streaming data rate, and the average may be increased or reduced by a function of the standard deviation.

According to an embodiment, scheduler 226 may further calculate a predicted seek delay for an asset when determining when to begin streaming a resource. The seek delay may vary depending on not only the streaming server, but also on a particular edit that was made to the asset. For instance, a media asset that does not include a starting cut may require no seek time, whereas when that same asset has a starting cut, the asset may require a much higher seek time in order to cue the asset for the starting cut. Application logic 220 may also collect historical metrics with respect to the seek delays for particular assets and servers. The predicted seek delay may also be a function of whether the streaming server source allows byte range requests, and where those byte ranges start and stop. For instance, if an edit to a stream starts at seventeen seconds into the stream, but the server only allows seeking operations in the equivalent of thirty second byte ranges, or does not allow byte range requests at all, the seek delay must take into account the amount of time needed to stream the first seventeen seconds of the stream so as to cue the stream to the starting cut. The streaming server may announce requestable byte ranges in, for example, headers or other metadata in the stream, or the scheduler may be configured to identify requestable byte ranges using any other suitable mechanism.

The predicted streaming rate and seek time may also or instead be a function of average metrics from other clients 210. Application logic 220 may be configured to upload the metrics to the server system 250, which calculates aggregated metrics based thereon to share with some or all of the other clients 210. Metrics may be aggregated globally for all clients 210, and/or contextually for subsets of similar clients 210, such as clients on a same subnet or clients having a same Internet Service Provider. Clients may utilize both globally and contextually aggregated metric to calculate the predicted streaming rate and seek time.

According to an embodiment, the scheduler 226 may further be configured to schedule request for assets in such a manner so as to limit the amount of memory necessary to buffer the assets. At its simplest, this may entail waiting to request assets until closer to when the assets are needed rather than requesting all of the assets when the rendering of the project starts. However, scheduler 226 may take a variety of other actions to reduce memory usage, such as subdividing media assets into portions and waiting to cache each portion until a time closer to when the portion is needed.

According to an embodiment, the scheduler 226 may be configured to request lower-quality versions of media assets for a period of time when scheduler 226 predicts that the client 210 will be unable to stream all of the required assets quickly enough to maintain real-time playback while rendering the project. The scheduler 226 may be configured with any suitable prioritization logic for determining which assets should be streamed at lower qualities, and which version should be requested.

According to an embodiment, the scheduler 226 must also take into consideration whether an asset can be streamed or must be downloaded. If an asset is not streamable, or if the scheduler 226 is uncertain whether the asset is streamable, then the scheduler 226 must allow time for downloading the entire asset before any portion of the project that includes the asset may be rendered.

According to an embodiment, only media assets are scheduled for retrieval by scheduler 226. Graphic assets are downloaded separately when imported into the project. However, in other embodiments, graphic assets may also be downloaded at render time.

According to an embodiment, scheduler 226 may also use metrics to calculate a predictive rendering time for certain complex image effects that may be applied to media data. Although many image effects may be rendered in hardware at real-time, more complex effects may need to be rendered in advance, and thus that rendering time needs to be taken into account when determining when to retrieve an asset. Scheduler 226 might also be configured to determine when there is not enough time to apply certain rendering effects, and apply alternative image effects or no image effects in their place.

Optionally, the scheduler 226 may accept input that specify how the predictive streaming rate and seek delay should be calculated. For example, three settings may be available—normal, optimistic (or "high"), and pessimistic (or "low"). These settings will cause the predictive streaming rate and seek delay to be calculated normally, optimistically, or pessimistically. For example, the optimistic calculation may assume that the client 210 has a relatively reliable connection compared to most clients 210, and thus weight the standard deviation differently or ignore certain metrics from certain groups of clients so as to produce a higher predicted streaming rate. As yet another option, the scheduler 226 may allow a user to explicitly increase or decrease the amount of buffering and/or predicted streaming rates on a percentage basis.

According to other embodiments, the scheduler 226 may instead or further take into account a variety of other considerations when scheduling the retrieval of media assets. Some examples of these other considerations are described in other sections. Note that, on account of the foregoing factors, the schedule may not always necessarily request the media assets in the same chronological order in which they appear in the project—for example, a particular media asset with a lower streaming rate, higher bitrate, or longer seek delay may need to be scheduled earlier than another media asset that appears chronological earlier than the particular media asset, if the earlier asset has a higher streaming rate, lower bitrate, or shorter seek time.

According to an embodiment, techniques similar to those described above may be utilized for a reverse playback of the project. The project timespan is reversed and the video data is rendered backwards. If a media clip cannot be streamed in reverse, the scheduler must be configured to buffer all of the media data in a clip before reaching the timespan when the clip is needed. Alternatively, if byte ranges of the media clip may be requested directly, the scheduler may subdivide the media clip into multiple clips at the byte range boundaries, and schedule the subdivided clips to be requested from last to first, as needed. A similar scheduling technique can be used to improve the smoothness of "scrubbing" the progress time locator through the project when the user desires merely to move to a specific time in the edited sequence and have as many intermediate times displayed correctly as possible, during non-real-time playback.

Streaming Client

According to an embodiment, a video editor 220 further comprises a streaming client component 229 configured to request and receive asset streams from, or send them to, streaming server 256. The streaming client 229 may be built into the network interface component 228, or the streaming client 229 may be a separate component. In an embodiment, although network interface component 228 may include capabilities of a streaming client, a custom streaming client 229 is implemented on top of or separately from the built-in streaming client, and configured with logic to manipulate the manner in which content is streamed from or sent to a streaming server 256 or proxy server 258 so as to optimize the real-time playback of a project.

3.5. Browser-Based Implementation

Figure 3:
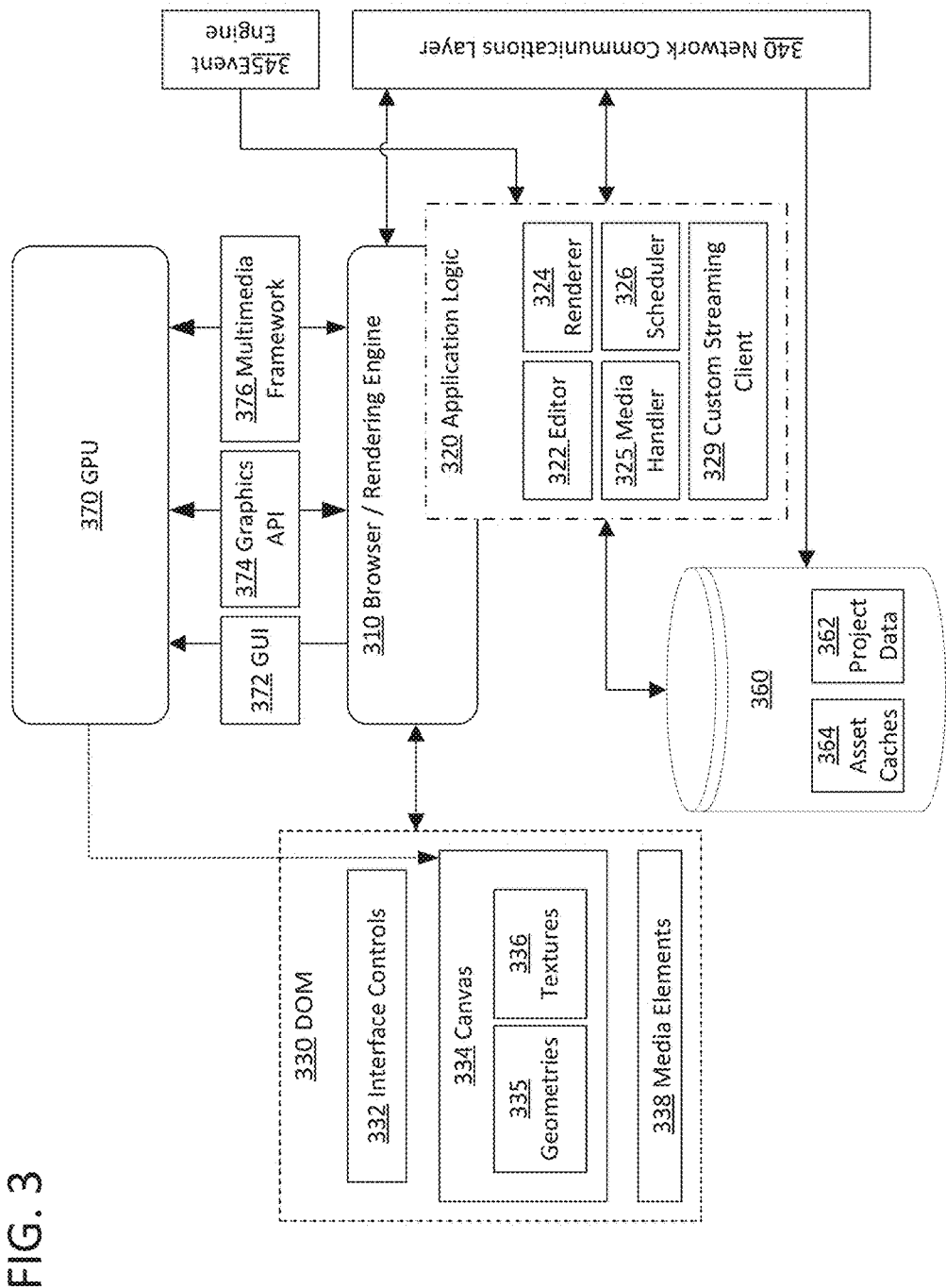
FIG. 3 illustrates components of a client configured with a web browser-based implementation of a video editing application.

FIG. 3 illustrates components of a client 300 configured with a web browser-based implementation of a video editing application such as video editor 220, according to an embodiment. FIG. 3 illustrates but one example implementation of a video editing application capable of performing the described techniques. Other video editing applications may include fewer or additional components in varying arrangements, including implementations other than browser-based implementations.

Browser Engine

Client 300 executes one or more processes referred to herein as a browser engine 310. A browser engine 310 is typically the primary component of a web browser application, such as Microsoft Internet Explorer or Google Chrome. A browser engine 310 processes data and instructions to generate and manipulate presentation(s) of information referred to herein as a document(s). As used herein, the term document does not necessarily refer to a single data structure, and may in fact include elements from a number of files or other data structures. A document also need not be a static presentation of information, but may include interactive elements by which a user may manipulate the presentation and/or issue commands to the browser engine 310.

A set of data and/or instructions processed by a web browser in such a manner as to produce one or more related interactive documents is herein considered to be a browser-based application. The depicted application logic 320 is one example of many browser-based applications that browser engine 310 may be configured to execute. Application logic 320 may be stored, temporarily or permanently, in one or more memories of client 310.

Browser engine 310 is coupled to a network communications layer 340, via which browser engine 310 uploads and downloads instructions, media, and other data from sources on a network. In an embodiment, browser engine 310 may utilize network communications layer 340 to request and receive application logic 320 from a server, such as application server 252, in response to user input requesting that the browser engine 310 "visit" a specified uniform resource locator (URL) associated with the server. The browser engine 310 may issue a single request to download application logic 320, or the application logic 320 may be downloaded over the course of multiple requests that are responsive to the browser engine 320 identifying resources referenced by the server's response to the initial request.

The browser engine 310 is configured to render a document by instructing a GPU 370—typically indirectly—to manipulate pixels in a frame buffer in such a manner as to depict the current state of the document. The GPU 370 then outputs the frame buffer directly to a display device. For instance, the browser engine 310 may be configured to issue instructions to draw text, windows, boxes, graphics, and other components of document to a graphical user interface ("GUI") component 372, typically supplied by an operating system executing on the client 300. The GUI component 372 translates the commands into drawing instructions to send to a GPU 370 for manipulating the frame buffer. GPU 370 may further be utilized for other purposes beyond outputting a frame buffer to a display device. For example, browser engine 310 may utilize a graphics API 374 and/or a multimedia framework 376 to send data to GPU 370 for processing, and read data back from the GPU 370. The GPU 370 may furthermore be configured to render graphics data from graphics assets or media assets directly into data structures managed by the browser engine 310, such as the canvas element 334 described in subsequent sections.

The browser engine 310 is further configured to process event messages from an event engine 345. Event messages may describe, for instance, input events such as the pressing of certain keys or combinations of keys on a keyboard, the detection of a user touching or clicking an area of a display screen that corresponds to an interactive element in the currently rendered document, timer-related events, messages from other application components, and so forth. The event engine 345 is typically coupled to input components that receive user input. The event engine may further comprise one or more layers in an operating system, browser engine 310, and/or application logic 320 configured to interpret that user input as input events. For instance, a device-level component may detect that a user clicked on a mouse button. A system-level component may determine that, based on a current context of the mouse device, the mouse click corresponds to a particular screen coordinate. A browser-level component may determine that the particular screen coordinate corresponds to a button element in a currently presented document, and that a button-click event has therefore occurred.

Document Object Model

The data and instructions processed by a browser engine 310 may take a variety of forms. One common form is that of data elements described in the Hyper-Text Markup Language (HTML). A browser engine 310 typically comprises rendering logic that parses and interprets the HTML elements, along with accompanying formatting instructions such as Cascading Style Sheets (CSS), as instructions for arranging and presenting information and interactive elements within a document.

A common form of instructions executed by a browser engine 310 is that of dynamic client-side scripting instructions, such as JavaScript instructions. A browser engine 310 typically comprises script processing component(s), such as a JavaScript engine or virtual machine, that interpret and/or compile such instructions, and then execute the interpreted or compiled instructions in such a manner as to affect the presentation of information within a document. Scripting instructions may refer to, rely upon, and/or manipulate various other types of data, such as data structures formatted in an eXtensible Markup Language (XML) format, JSON format, or other suitable format.

According to an embodiment, in the course of executing application logic comprising the foregoing types of data and instructions, such as application logic 320, a browser engine 310 generates and manipulates a document object model (DOM) 330 that represents a document. The document object model 330 includes a hierarchy of elements (also referred to as "nodes") that correspond to various components of the document, such as sections, textual elements, images, buttons, hyperlinks, and so forth. The elements may, for instance, correspond directly to HTML elements defined by tags in a web page or to objects created in JavaScript functions.

Based on the document object model 330, the browser engine 310 renders the document, at least partially, by sending commands to GUI component 372 to draw the information and interactive items represented by the DOM elements on a display. Each DOM element may have various configurable attributes, including attributes that affect the presentation of the element. Examples of attributes for a DOM element include screen or window coordinates at which the element are to be presented, element sizes, background or fill colors, displayable text, image data, audio data, and so forth. An element may or may not be visible in the presentation rendered by the browser engine 120, depending on the element type and/or the various attributes associated with the elements.

Further based on the document object model 330, the browser engine 310 identifies elements that are impacted by event messages from event engine 345, and executes various instructions that are triggered by the event messages with respect to those interactive elements. The triggered instructions may affect the configurable attributes of existing elements and/or add new elements to the document object model 330. Browser engine 310 may therefore re-render the document after executing the triggered instructions, if necessary.

The document object model 330 defines a programmatic interface by which each element is addressable. The programmatic interface defines a number of functions which may be performed with respect to each object, depending on its type. Execution of these functions by browser engine 310 may result in changing attributes of elements, adding or deleting elements, requesting new data, sending instructions to other components of client 300, and so forth. Instructions processed by browser engine 310, including application logic 320, may reference and trigger these functions using the programmatic interface. Browser engine 310 may re-render the document any time the elements within the document object model 330, or attributes thereof, change as a result of interaction with the programmatic interface.

Document object model 330 may comprise a variety of element types, most of which are not depicted for purposes of simplification. However, among other types of elements defined by the document object model 330 are interactive control elements 332. Through these interactive control elements 332, application logic 320 may implement any graphical user interface input mechanism described herein. Interactive control elements 332 may be buttons, hyperlinks, text boxes, graphics, or other items within the document whose screen positions correspond to graphical user interface controls. That is, a user may place a cursor, stylus, finger, or other pointing device over the screen position of an interactive control element 332 to submit input that will be processed by event engine 345, typically resulting in an event message that is associated with the interactive control element 332.

Media Handlers

Another common form of data processed by a browser engine 310 is media data, such as data representative of images, video, or audio. A browser-based application typically instructs the browser engine 310 to load URLs using media elements 338, such as video elements, audio elements, or img elements. Such elements, like any other DOM elements, may be found in HTML-based web pages and/or added to the DOM dynamically via JavaScript. The media data may be loaded from both local (i.e., file system) URLs and remote URLs.

Certain URLs may request streaming media from streaming servers such as streaming server 256. The network layer 340 is configured to continually send requests for portions of the media stream to such a URL until the streaming server indicates that the required portion of the media data has been completely streamed. As the media data is received, the browser engine 310 caches the media data in an asset cache 364 in one or more data stores 360 until the media data is no longer needed. The browser engine 310 may begin rendering the media data stored in the cache as soon as the first portion of the media data is received, or wait until it is instructed to play the media data. For instance, when a portion of media data has been played, the browser engine 310 may delete that portion. Or, the portion may be retained until aged out of the cache using a suitable caching policy.

DOM 330 provides programmatic access to media elements 338. A programmatic interface is provided to control aspects of both media playback and streaming. For instance, via JavaScript function calls on media elements 338, application logic 320 may instruct browser engine 310 to start playback, seek to a specific timestamp, see how much media data is already buffered, see how much media data has been played, change the media source, and so forth. Media elements 338 may also be dynamically added and removed from DOM 330 via application logic 320.

The browser engine 310 may include various renderers for interpreting the media data and outputting raw media data. For example, many modern browser engines include native support for decoding H.264 or WebM formatted video streams. In some embodiments, the application data 320 may include media handler components 325 to perform various media processing tasks, including decoding, encoding, and applying visual effects. In one embodiment, application logic 320 includes a first media handler 325 for HTML5 streaming video that utilizes the browser engine 310's native support for H.264 and WebM data. Application logic 320 also includes a second media handler 325 for handling video in other formats. For instance, the second media handler may be a JavaScript-based implementation of a media handling library such as the open source FFmpeg project. The browser engine 310 may render the media data to the GPU 370, a canvas element 334, a Scalable Vectors Graphic (SVG) element, other software, or any other suitable system.

In an embodiment, the browser engine 310 or media handler 325 may send media data to one or more media frameworks 376 for processing. These media frameworks 376 may interpret the media data and output raw media data back to the browser engine 310 or media handler 325, or to the GPU 370. For instance, an operating system on client 300 may feature a suitable native media framework. Or, a media framework may be installed on the client 300 by other software. The media framework may in turn reference instructions from various modular software libraries for decoding different types of media and/or be configured to send certain types of media data to hardware decoding components. In an embodiment, a media framework 376 may further be configured to process various filters or transforms with respect to inputted media streams, such as resizing the media or applying special effects.

Graphics API

According to an embodiment, the instructions processed by browser engine 310 may include instructions for drawing lower-level graphic elements, such as lines and primitive shapes, to a defined space within the document. This space is then rendered as a bitmap within the document. For example, another element type depicted in document model 330 is a canvas element 334. Canvas element 334, corresponding to the HTML <canvas> tag, is a drawable region, having a defined position, height, and width. Using instructions in JavaScript or another suitable scripting language, application logic 320 may instruct the browser engine 310 to draw lines and shapes at specific coordinates within the canvas element. Canvas element 334 is an example of a suitable drawable region element, and other drawing region elements may exist in other embodiments. The stage area 120 of FIG. 1 may, for instance, be implemented by a canvas element.

Various interfaces 374 for drawing within a drawable region may exist. These interfaces may allow drawing in a two-dimensional space or a three-dimensional space. In case of drawing in a three-dimensional space, the drawings are projected and then rendered into a two-dimensional bitmap for display in the drawable region. Some interfaces 374 allow the application logic 320 to instruct the browser engine 310 to draw within the drawable region of a document. In an embodiment, rather than instructing the browser engine 310 to draw within the drawable region, a browser engine 310 may include a graphics API 374 by which application logic 320 may issue drawing instructions directly to GPU 370. Though a variety of drawing instructions may exist, generally the drawing instructions allow a user to create and draw geometries 335 and create and draw textures 336 on those geometries. When requested to do so by API 374, the GUI 370 renders the drawing to the canvas, projecting the drawing to a two-dimensional screen space if the drawing is three-dimensional.

In one such embodiment, the graphics API 374 is the Web Graphics Library (WebGL). WebGL is a JavaScript API for rendering interactive 3D computer graphics and 2D graphics within any compatible web browser without the use of plug-ins. WebGL instructions allow for GPU accelerated usage of, for example, geometry, shading, physics, image processing, and effects. WebGL elements can be mixed with HTML elements and composited with other parts of a document or document background. WebGL instructions may include both control code written in JavaScript and shader code that is executed on a computer's Graphics Processing Unit (GPU). In other embodiments, other graphics APIs may provide similar functionality and may be utilized instead of WebGL.

3.6. Browser-Specific Application Logic

Although browser engine 310 may be utilized to execute a wide variety of application logic, the depicted application logic 320 is configured to implement video editing and rendering tasks described herein. Application logic 320 constitutes an example of the video editors 220 depicted in FIG. 2.

Editor

The application logic 320 includes an editor component 322 configured to create and manipulate projects, as with editor component 222. Editor 322 utilizes the interface controls 332 and other elements of DOM 330 to present project editing interfaces, such as that depicted in FIG. 1, and to receive input defining and manipulating project data 362. Project data 362 may be stored in one or more local data stores 360 at client 300, such as data stores provided by the browser engine 310, including but not limited to HTML5 (or W3C) web storage, memory, etc. Project data 362 may also be downloaded from and synchronized with project data from a server system, such as may be found in asset repository 264 of FIG. 2.

Renderer

The application logic further includes a renderer component 324 that renders the project data 362. The project data 362 references assets stored in an asset buffer 364 and/or downloadable or streamable from one or more servers. The application logic 320 may instruct the browser engine 310 to download assets into a asset buffer 364 via network communications layer 340. Asset buffer 364 may be found in the one or more local data stores 360 of client 300. The renderer 324 is configured to render the project data 362 by rendering the downloaded and streamed assets as described in other sections.

In an embodiment, renderer 324 is optimized to utilize the other components of client 300, such as the graphics API 374 and multimedia framework 376, in such a manner as to provide real-time playback of the rendered project data 362. For example, in an embodiment, the graphic assets in a project may be described as drawing instructions to a 3D graphics API 374 or other programmatic drawing interface. In other embodiments, application logic 320 may include code for converting data within a graphic asset to drawing instructions in a suitable programmatic drawing interface.

According to an embodiment, renderer 324 is configured to render media assets into a three-dimensional scene using a combination of media elements and WebGL instructions. A video element is included in a web page or added to the DOM 330. The video element is hidden within the document using CSS formatting or other techniques. The source of the video element is set to a URL from which the corresponding media asset may be streamed. The browser engine 310 begins caching the media data. Meanwhile, WebGL instructions to draw a geometry are issued to the browser engine 310. The media element is then bound to the surface of the geometry as a texture, and a command is issued to play the media data. From thenceforth, whenever an instruction that requires rendering the texture on the geometry is processed, the WebGL library is configured to automatically retrieve the currently playing image frame from the media data and render it to the texture. Hence, as the texture is repeatedly rendered over time, the media data will appear to be playing on the surface of the geometry, even as that geometry moves, rotates or is otherwise transformed or animated.

Scheduler

In an embodiment, the application logic 320 optionally includes a scheduler component 326. Scheduler 326 is configured to coordinate the downloading and streaming of assets in the project as the project is being rendered, in similar manner to scheduler 226.

In addition to the considerations used by scheduler 226 in scheduling assets for retrieval, scheduler 326 is configured to identify browser-based constraints on the streaming and storage of assets, and to schedule assets for retrieval accordingly. For example, a browser engine 310 places security-based or other types of limitations on the number of active media elements 338 that may simultaneously exist on DOM 330 at given time. An "active" element is an element that is, at the time it is considered active, currently streamable (for streaming media assets) or downloadable (for other assets). These limitations may vary based on the browser engine 310 or even the operating context. One browser engine 310 might allow only one active media element on the DOM 330 at a given time, while another might allow eight, while another might allow twenty.

In embodiments where media elements are bound to textures using WebGL, if the number of media assets visible (or playing audio) at a certain time within a project are greater than the number of active media elements 338 allowed on the DOM 330, then either some media assets cannot be rendered, or media elements 338 must be managed and scheduled (e.g., reused, etc.) to render a greater number of media assets than the allowed active DOM media elements. With the latter option, in many cases all of the media assets within a project can be accommodated for by carefully scheduling media elements 338, for example, to be deactivated or removed from DOM 330 when their corresponding media assets are no longer needed. That is, once streaming media has been queued up within a media element 338, it can be buffered and the media element 338 may made inactive to allow for another active media element 338 on the DOM 330. New media elements 338 may then be made active on the DOM 330 to request additional media assets as they are needed.

In some embodiments, an alternative to making obsolete media elements 338 inactive and activating new media elements 338 may be to simply change the sources of the obsolete media elements 338. Since the effect of these actions are, for the purposes of the described techniques, the same, changing the source of a media element 338 shall be considered herein to constitute one way of deactivating a media element 338 from the DOM and replacing the media element 338 with a newly activated media element 338 in the DOM 330.

As a result of the foregoing limitations, application logic 320 may be required to constantly add and remove media elements 338 and activate and deactivate media elements 338 during rendering of a project in order to support hundreds or thousands of edits in the project. Scheduler 326 is thus configured to determine the amount of active media elements allowed on the DOM 330, as well as which elements are currently active. If limitations are present, scheduler 326 is then configured to schedule the retrieval of media assets in such a manner so as to have no more than the limit of active media elements on the DOM 330 at a single time. The scheduler 326 may thus schedule deactivating media elements 338 from the DOM 330 and activating new media elements to the DOM 330 as needed. The scheduler 326 is configured not only to determine how far in advance an asset must be retrieved, but also when there may be an available active media element to retrieve it with.

In more complicated cases, the scheduler 326 may support scheduling the retrieval of concurrently playing media assets even if only one active media element is available. The scheduler 326 essentially subdivides each media asset into multiple clips, and repurposes the available active media element to stream each clip from each media asset in alternation. For instance a first media asset and a second media asset may be playing concurrently. Rather than stream the entire required timespan of the first media asset into a media element at once, the scheduler 326 may schedule only a portion of the timespan of the media asset to be streamed into a first media element 338 which is currently active. Once the data for the first portion is cached, the first media element 338 may be deactivated. A second media element 338 may be added to the DOM 330, and made active. A portion of the timespan of the second media asset may then be streamed to the second media element 338. Once the portion of the second media asset has been cached, the second media element 338 may be deactivated, the first media element 338 may be activated again, and the next portion of the first media asset may be streamed to the first media element 338. The first media element 338 and second media element 338 may continue to be deactivated and activated in alternation until each portion of each media asset has been streamed.

Although the technique logically scales to any number of media assets, as a practical matter, the number of media assets in some projects may be too large to effectively stream all media assets on certain types of clients 300 or certain types of browser engines 310 while the project is being rendered for real-time playback. The scheduler 326 may be configured to predict when this may occur, and prioritize which media assets to display at which times using any suitable prioritization algorithm. For example, the scheduler 326 may identify media assets to not request based on the projected screen size of the media asset when displayed, or based on a user-specified prioritization of the media assets or surfaces to which the media assets are bound.

In another embodiment, during real-time rendering and playback of a project, scheduler 326 may schedule a portion of the project to be rendered in a non-real time manner into a media cache in advance of a time when that portion will be needed for playback. The portion may then be played from the media cache at the designated time during the real-time playback. This may be useful, for instance, if the portion of the project is too complex to render and play in real-time, or if there will not be enough resources to render and play that portion of the project in real-time, but there are enough resources to render the portion while other portions are being played.

Streaming Client

In an embodiment, the application logic 320 optionally includes a custom streaming client 329. While network communications layer 340 may already provide a streaming client, custom streaming client 329 extends the functionality of the streaming at the network communications layer 340 by, for example, redirecting certain streaming requests to a proxy server and/or including certain parameters with a request that affect how much data the streaming server returns to the streaming client 329.

For example, in an embodiment, a browser engine 310 by default may cache a certain amount of media data for a media element 338, such as 50 MB of a 200 MB stream, under the assumption that it is always good to cache as much media data of a playing media stream as possible. However, for the purposes described herein, it may be desirable to limit the amount of data cached for a media element 338. This may be because, on account of edits or scheduling, only a very small portion of video data may actually be needed from the video stream (e.g. 5-10 seconds, or 1-2 MB, of video data) or for other reasons. But because most streaming servers will continue streaming as much video data to a media element 338 as possible, assuming the stream has not ended, eventually the cache for the media element 338 will balloon to significantly more than 2 MB, with the vast majority of the cached media data wasting both client memory and streaming bandwidth.

As suggested in previous sections, a proxy server may be utilized to control how much streaming media data the media element 338 receives and caches. To facilitate this behavior, scheduler 326 may be configured to recognize when there is a great difference between the amount of video data needed for a media asset and the amount of video data that may be cached inside the corresponding element 338 without intervention. When the difference is greater than some threshold and/or when it is necessary to constrain the amount of video data cached for an element 338 to successfully schedule assets for real-time playback, the scheduler 326 may instruct the streaming client 329 to request a stream from a proxy server instead of the identified origin source. The scheduler 326 may also indicate exactly how much data to request.

In response, the streaming client 329 is configured to send a request to the proxy server with several parameters embedded (and optionally encrypted) within a query parameter or HTTP request header: the URL of the original stream, and the amount of data requested. The proxy server requests the normal (full) amount of data from the origin source, but limits the data it forwards to the streaming client 329 to the amount in the embedded parameters of the client request. Assuming that not all of the required data is received in the first response, the streaming client 329 makes additional requests for data from the proxy server. For each forwarded segment of the stream, the proxy server manipulates the response header from the source to indicate that there is less information left in the stream than the proxy server repeats. Once the requested amount of data has finally been streamed from the source, the proxy server manipulates the last response header to indicate that no data is left, even if data is in fact left to stream from the source. The streaming client 329, seeing this header, consequently ceases to request further data from the stream.

In an embodiment, other forms of custom streaming clients may be utilized to perform other methods of limiting the amount of data streamed, or to perform other streaming functions during either reading data from the server or writing data to the server.

3.7. Miscellaneous

Systems 200 and 300 illustrate only two of many possible arrangements of components configured to provide the functionality described herein. Other arrangements may include fewer, additional, or different components, and the division of work between the components may vary depending on the arrangement. For example, in some embodiments, a scheduler 326, custom streaming client 329, asset queue 364, graphics API 374, multimedia framework 376, or other component of system 300 may be omitted, along with any other components relied upon exclusively by the omitted component(s). In other embodiments, tasks performed on client-based video editor 220 may be performed instead on server system 250 or vice versa.

4.0. Functional Examples

In some embodiments, the generating and sharing of edited video data may be greatly simplified using client-side editing and rendering of media projects involving media clips that are streamed across a network. FIGS. 4-12 illustrate example flows for utilizing systems such as described above for these and other objectives, according to various embodiments. The various elements of these flows may be performed in a variety of systems, including systems such as systems 200 and 300 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

4.1. Example Editing Flow

Figure 4:
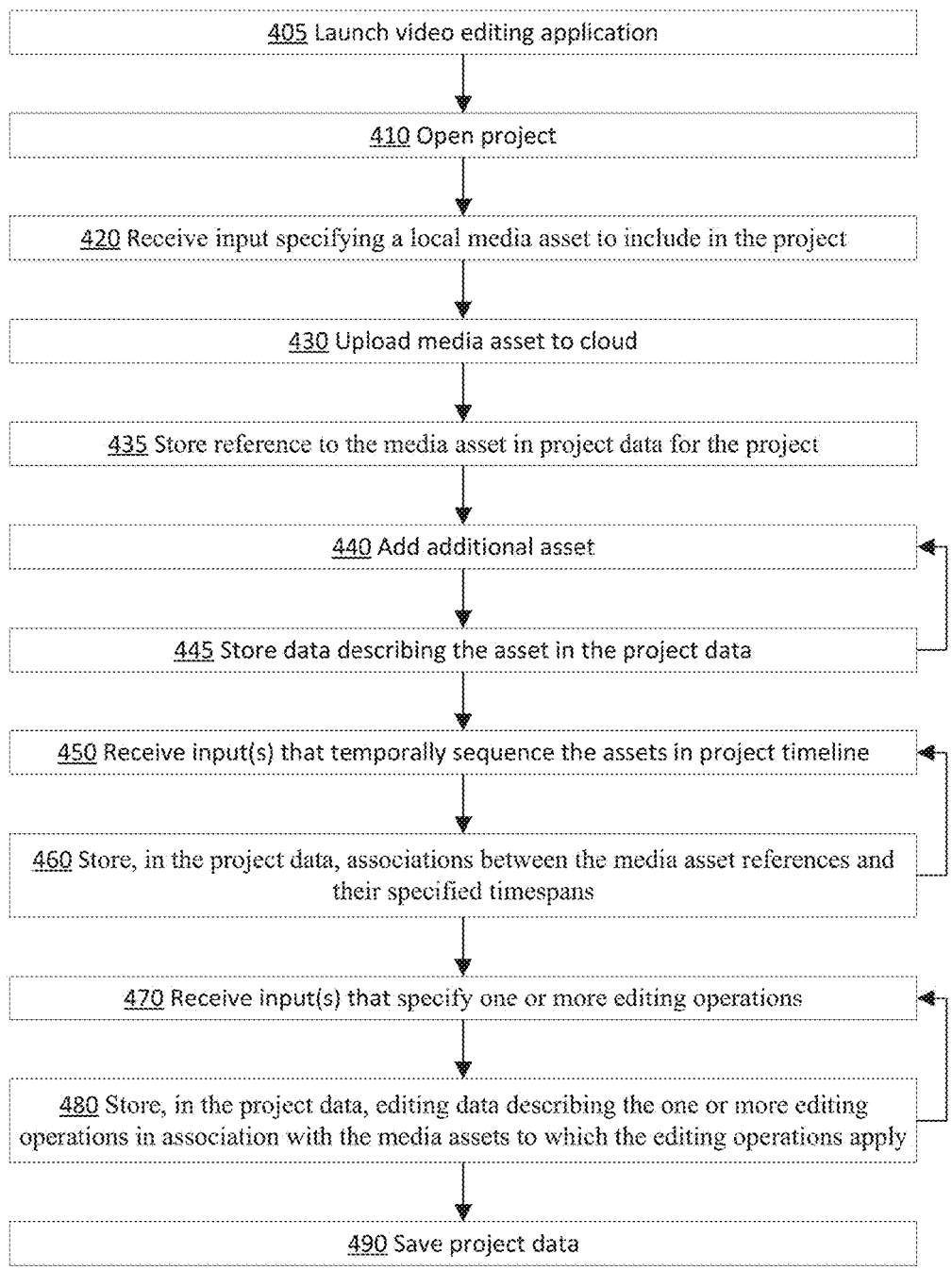
FIG. 4 illustrates an example flow for editing a media project.

FIG. 4 illustrates an example flow 400 for editing a media project, according to an embodiment. Block 405 comprises launching a video editing application. A user may request to open a video editing application in a variety of manners. For instance, the user may click or touch an icon that instructs the user's operating system to launch an executable file storing the application instructions. Or, the user may click on a button on a web page to direct the user's web browser to load a web page from a specified URL, such as a web page hosted by server system 250. The web browser may download the specified web page, which includes and/or directs the web browser to further download application logic such as application logic 330. As a result of launching the video editing application, a GUI for editing a project, such as interface 100, is presented at the user's client device.

Block 410 comprises opening a project. For instance, the user may create a new project by selecting a control such as new project button 161. Or the user may select an existing project from a library of previously saved projects belonging to the user or shared with the user, by selecting control open project button 163 or by dragging a thumbnail 112 representing the project from the media search view 110 into either the stage 122 or the timeline 130. In an embodiment, the video editing application may download both a listing of projects and the project data for the selected project from a server, such as server system 250.

As another example, a user may receive or access an email, social media post, messaging system, or other resource with a link for opening a project. Another user may have shared such a link and granted permission to view and/or edit such project with the user. The link includes an instruction to load the video editing application, such as the URL of the video editing application or a reference to a protocol that is understood by the user's operating system to require handling by the video editing application. The link further includes a URL or other identifier of an existing project, which causes the video editing application to immediately load the existing project upon opening.

Block 420 includes receiving input specifying a local media asset to include in the project. For instance, the user may select a control for adding a new media asset to the project. The video editing application may then provide a file explorer or navigation tool, by which the user selects a locally stored image, audio track, or video file to add to the project. In an embodiment, the user may drag an icon or thumbnail representing the new media asset from the file explorer or navigation tool on to a timeline or staging area of the GUI, so as to associate the new media asset with a timespan and/or spatial location. However, in other embodiments, the user simply selects the new media asset, and the new media asset is added to a default temporal and/or spatial location, from which it may subsequently be moved.

In an embodiment, a file explorer or navigation tool may be provided externally to the video editing application, such as by the file system or a video library tool. The media asset may be added to the project by dragging an icon or thumbnail representing the media asset on to the GUI. Or, an option to add the media asset to a video editing project may be shown in a contextual menu while the media asset is selected. In this case, selecting the option may cause performance of block 405, as well as either opening a new project in block 410, or displaying a menu from which an existing project may be selected.

Block 430 comprises, optionally, uploading the local media asset to a server for storage in an asset repository, or in other words uploading the media asset "to the cloud." Some embodiments may require that local media assets be uploaded to the cloud before they can be rendered in a project. In at least one embodiment, this step is necessary to avoid security restrictions in certain types of browser engines. Other embodiments may allow for the use of local media assets in projects, without being uploaded to a server. Some such embodiments may nonetheless give the user an option to upload the local media asset to the cloud.

According to an embodiment, block 430 may comprise transcoding the media asset to one or more different formats. For instance, the video editing application may compress the media asset on upload to reduce the upload size and/or convert the media asset to an encoding format optimized for editing, streaming and rendering, such H.264 with optimal encoder settings. A variety of software and/or hardware media components may be utilized at the client device to perform such a task. In one embodiment, a Javascript-based implementation of the FFmpeg open source library may be utilized for this task. As another example, the server may be configured to convert the media asset to an optimized encoding format, or to generate multiple versions of the media asset for use in different contexts, such as high-resolution and low-bandwidth versions.

Block 435 comprises storing a reference to the media asset in project data for the project. If the media asset is uploaded to the cloud, the project data will generally include a cloud-based reference to the media asset, such as an asset repository identifier or URL, so that the media asset can subsequently be streamed from the cloud when the project is opened on another client device.

Block 440 comprises adding an additional asset to the project. The additional asset may be selected from media assets, graphic assets, or other projects. A variety of mechanisms may exist for adding the asset. For instance, additional local media files may be selected per block 420. The video editing application may also provide a library browsing tool by which existing assets in a cloud-based asset repository may be searched, filtered, selected, and added to the project in similar manner to the adding of a local media file in block 420. The video editing application may also or instead include a control for directly inputting URLs of assets to add to the project. Each additional asset may be added at a different temporal location and/or spatial location within the project, or overlaid on top of another asset.

Block 445 comprises storing data describing the asset in the project data. The data describing these assets may be similar to that stored in block 435. Or, for certain graphic assets, the project data may actually include the graphic assets. Flow may repeat at block 440, or continue to block 450.

Block 450 comprises receiving input(s) that temporally sequence the assets in a project timeline. As a result, project start times may be specified for each media asset, when the media asset will first be played/rendered in the project. Furthermore, the input(s) may specify at what point within the total duration of the asset playing of the asset should start and at what point playing of the asset should stop (i.e., the clip starting and ending times, or clip timespan). Such input may be received in a variety of manners. For instance, assets may be linearly arranged in one or more project "tracks" within the GUI. A start time associated with each asset may then be calculated based on the sum of the clip times of all assets sequenced before the asset in the track assigned to the asset. Or, an icon representing the asset may be dragged to a specific timespan in a timeline, or locked to the timespan of another asset in the timeline. Or, a starting timestamp may be inputted explicitly in a time field associated with the media asset.

If an inputted asset has a duration (e.g. the duration of an animation effect), the duration of the asset may be interpreted as the duration of the asset when the asset is laid out on the timeline. However, the duration may then subsequently be manipulated through inputs such as described above.

Block 460 comprises storing, in the project data, associations between the media asset references and their specified timespans in the project timeline. In embodiments where the media assets may be arranged spatially as well, the spatial location and layout information associated with the media asset may also be stored. For instance, a three-dimensional coordinate corresponding to the origin of the media asset may be stored. Or, a geometry to which the media asset is mapped may be stored in association with a reference to the media asset.

Block 470 comprises receiving input(s) that specify one or more editing operations to perform with respect to assets in the project. This step is performed with respect to at least one media asset, such as the asset uploaded in block 430 or an asset added in block 440. One such editing operation may be a trim or editing cut of the media asset, to create a media "clip." For instance, rather than rendering the media asset from the start of the asset, a user may specify that the media asset is to be rendered from a certain start point, or "clip" start point. Such an edit may be specified in a variety of manners. In one embodiment, the video editing interface may depict a timeline of the media asset, and allow the user to drag and drop a sliding clip start indicator to different timestamps on the timeline. In another embodiment, the video editing interface may include controls for performing a streaming playback of the media asset. The user may click on a certain button to indicate a clip start time when the playback reaches the frame in which the user is interested. As another example, the user may specify a clip start time by directly entering a seek amount to associate with the clip start time. Clip end times may be specified in similar manners.

Another editing operation may be to specify an image effect, such as a blur or image correction, to apply to the media asset before rendering the media asset. The image effect may be applied to the whole media asset, or just a selected timespan therein. The image effect may also be applied to a scene of assets rather than just a single asset. In an embodiment, the video interface may include a preview window to see the image effect applied to the media asset. For instance, the media asset may be streamed from its source and played to the GPU along with applicable image effects instructions. The media asset is then rendered to a portion of the GUI for the user to see.

Block 480 comprises storing, in the project data, editing data describing the one or more editing operations in association with the media assets to which the editing operations apply. Note that, rather than applying the editing operation to the media assets directly and storing the manipulated media assets, block 480 comprises leaving the media asset untouched, and merely storing enough data to reproduce the editing operation at a later date. For instance, for trimming operations, a clip start and clip stop time may be saved. For image effects, a description of the image effect and any associated parameters may be saved. The process of generating and storing this project data is known as "non-destructive" editing. The entire editing and rendering pipeline described in this document is architected and implemented in a fully non-destructive manner.

Block 490 comprises saving the project data. Block 490 may be performed in response to explicit user input, such as selection of the save button 162, or block 490 may be performed any time a user submits input that results in a change to certain aspects (or any aspects) of the project or at any other time that the application deems it appropriate to save the project data.

As should be clear, the above functional blocks may be repeated many times, and need not always be completed in the exact chronological order in which they are depicted. The flow may involve the performance of other steps known in the art that are not depicted for simplification. Moreover, other editing workflows may include a variety of other elements not depicted, and/or lack certain elements depicted in FIG. 4. For instance, the adding of a local media asset in step 420-435 may be optional. Or, no editing operations may be necessary in block 470.

In an embodiment, certain portions of the above editing workflow and of other editing workflows described herein may be completed as the project is being rendered and played back in real-time. That is, assets may be added, resequenced, and edited simultaneously with the rendering and playing of the project, in such a manner as to dynamically apply the changes to the project as it is being played in a stage or other viewing area. This "live-editing" of the project data allows a user to immediately visualize changes. The playing may also be looped continuously over either the whole project timeline, or just a user-selected timespan thereof.

4.2. Example Rendering Flow

Figure 5:
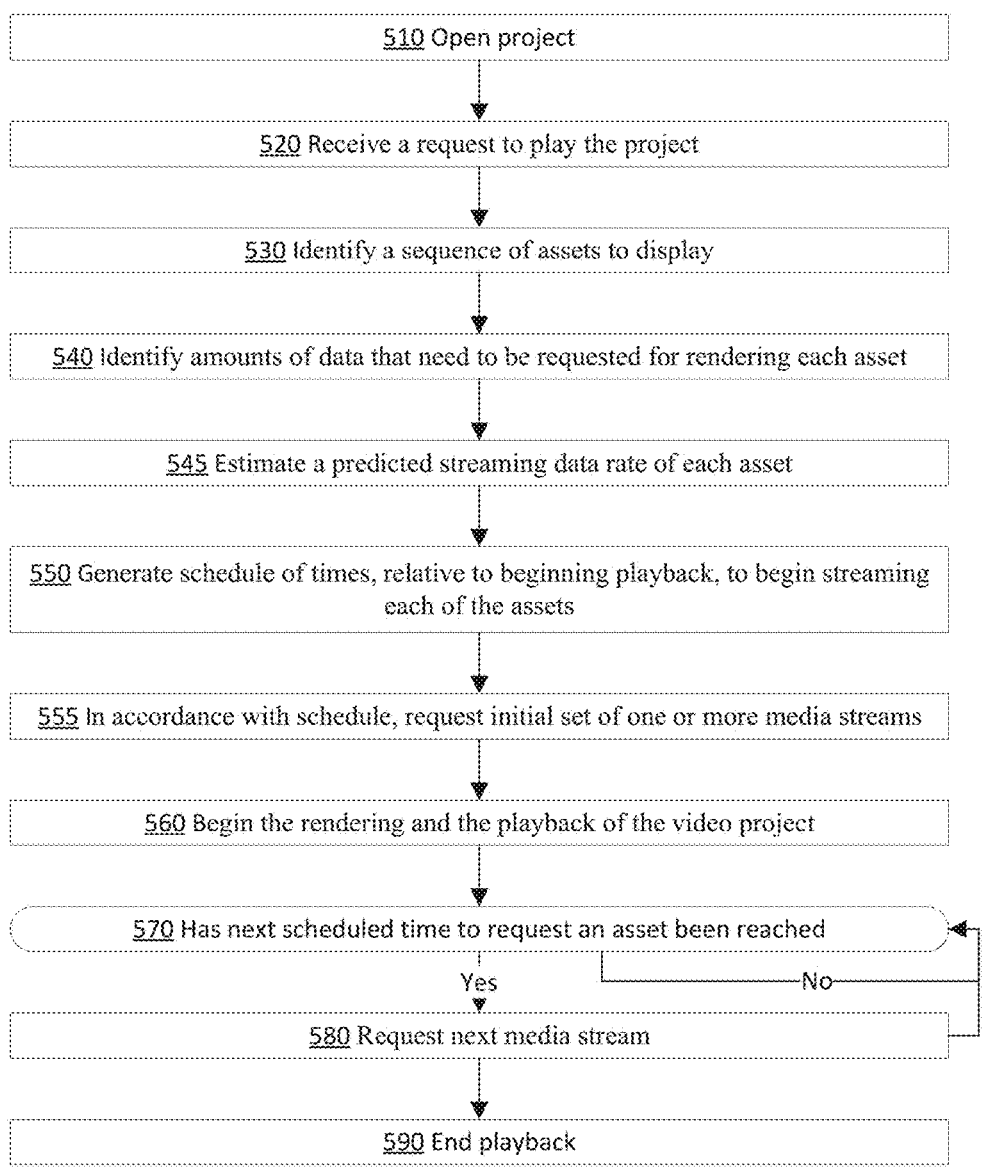
FIG. 5 illustrates an example flow for rendering a media project.

FIG. 5 illustrates an example flow 500 for rendering a media project, according to an embodiment.

Block 510 comprises opening a project in a video rendering application. This block may be performed in similar manner to blocks 405-410 of FIG. 4. The video rendering application may be the same as the video editing application, or a separate video rendering application. If the video rendering application is separate from the video editing application, the video rendering application may present a streamlined GUI with controls for a smaller subset of tasks than the editor, such as playback controls and sharing controls. If the project is opened in a video editing application, additional elements of flow 400 may also be performed prior to proceeding to the next block.

Block 520 comprises receiving a request to play the project. For instance, a user may select the play control button 140. In an embodiment, this request is not necessary, in that the video rendering application may be configured to begin rendering and playing the project as soon as the project is opened in block 510.

Block 530 comprises identifying a sequence of assets to display. The assets at least include streaming media assets, but may also include other assets described herein. The sequence is determined based on associated timespans specified in the project data.

Block 540 comprises identifying amounts of data that need to be requested for rendering each asset. The amounts may have been pre-calculated and saved in the project data. The amounts of data needed for media assets may need to be calculated based on factors such as the overall length of the media asset, the trimmed length of the asset, the amount of data that must be seeked through to cue the clip to the clip start time, the average bitrate of the clip, and so forth. Some or all of this data may be saved in the project data, or certain aspects of this data may need to be requested from the source of the media asset during performance of this block. The amount of data may not necessarily be an exact number, but rather may be an estimate. However, if the same clip has been streamed to a client rendering the project in the past, that client may have stored the exact amount of data streamed (and other streaming or seeking metrics) in the project data for future reference.

Block 545 comprises estimating a predicted streaming data rate of each asset. Techniques for estimating a predicted streaming data rate are described elsewhere herein.

Block 550 comprises generating a schedule of times, relative to beginning playback of the project, to begin streaming each of the assets. For instance, an asset A may need to be requested two seconds before beginning playback, whereas an asset B may need to be requested only one second before playback, and an asset C may not need to be requested until a minute after playback begins. Generally, the scheduling involves calculating times by which each asset should be requested in order to be ready for real-time playback during the rendering of the project. However, the scheduling can be quite complicated in projects with large numbers of assets.

Among other aspects, the calculated times may be functions of the amounts of data to request, how much of the data for a particular asset is being consumed for seeking versus being rendered in the project, the bitrate of the clip, the predicted streaming rate, the predicted streaming rates of other media assets and the times by which those assets are needed, the maximum streaming bandwidth available, amounts of processing time needed to render certain types of edits on the media assets, and so forth. In an embodiments, the times are further calculated based on a maximum number of streams that may be concurrently requested, on account of limitations such as the afore-mentioned limitation of the number of media elements that may exist on a DOM. In some embodiments, the scheduling may involve more complicated tasks, such as determining when to add and remove media elements from a DOM, determining when and how to subdivide the streaming of a clip into separate streaming operations to workaround limitations on concurrent streaming operations, determining whether to send a streaming request to a proxy server instead of the original media source, determining whether to request a low-quality version of an asset, determining whether to render an asset at all, and so forth. Techniques for generating this schedule are described elsewhere herein in more detail.

Block 555 comprises, in accordance with the schedule, requesting an initial set of one or more media streams. The requests may be sent in a variety of manners, such as adding a media element to a DOM. The requests may include, if supported, an identification of a specific timestamp or byte range at which to start the streaming, a specific version of the stream that is being requested, or a specific track in the stream that is being requested.

Block 560 comprises, in accordance with the schedule, at some point after block 555, beginning the rendering and playback of the project. There may be a small delay between block 555 and block 560 in order to buffer a sufficient amount of data to ensure that the project can be rendered and played in real-time.

Block 570 comprises determining whether a next scheduled time to request a media asset has been reached. If not, flow loops back to block 570 to continue checking for the next scheduled time. If a scheduled time has been reached, then flow proceeds to block 580 to request the asset associated with the time, in similar manner to block 555. The rendering and the playback of the project is being performed throughout the performance of these blocks. Moreover, the streaming of certain media assets requested in block 555 or previous iterations of block 580 may be completed during performance of these blocks.

Block 590 comprises ending playback of the project, either at the end of the project timeline, or in response to a command from a user.

The above process flow illustrates only one example of a process flow for rendering a media project, and may involve other elements known in the art that are not depicted for simplification. Other flows may include additional, fewer, or alternative elements in varying arrangements.

In an embodiment, the playback of the project may begin at any arbitrary point within the project timeline. The above elements are thus performed only with respect to the assets whose timespans are at least partially subsequent to the playback starting point, and only with respect to that portion of each asset which is rendered subsequent to the playback starting point. The playback may also be reversed from any arbitrary playback start point, in which case the above elements are performed with respect to assets that precede the playback start point, and only to the extent that they precede the playback start point. In another embodiment, certain portions of both the preceding and the subsequent assets from the arbitrary starting point are rendered in the above elements to allow continuous playback of the edited sequence when the user drags the progress time locator forwards and backwards (i.e., "scrubs" the timeline progress locator). The playback may be paused and resumed at any time, in which case the schedule may likewise be paused and resumed.

The playback rate may also be changed at any time during the project, which may require a recalculation of the schedule from the timestamp at which the change in playback rate was initiated, since the playback bitrate of each media asset is effectively multiplied by the new project playback rate. The recalculation may be performed relatively quickly, and in many cases there may be little or no delay before resuming rendering or playback with the new schedule.

In an embodiment, certain edits to the project during real-time rendering and playback may also require that the schedule be recalculated from the current project playback point, per steps such as given above. For instance, the addition of new assets, trimming operations, and/or complex image effects while the project is playing may all require that the schedule be recalculated on the fly so that the real-time rendering and playback can continue without interruption.

In an embodiment, the schedule may be saved in association with the project data along with various other data and metrics used to calculate the schedule. The schedule may thus be subsequently re-used or optimized for future renderings.

4.3. Example Animation Editing Flow

Figure 6:
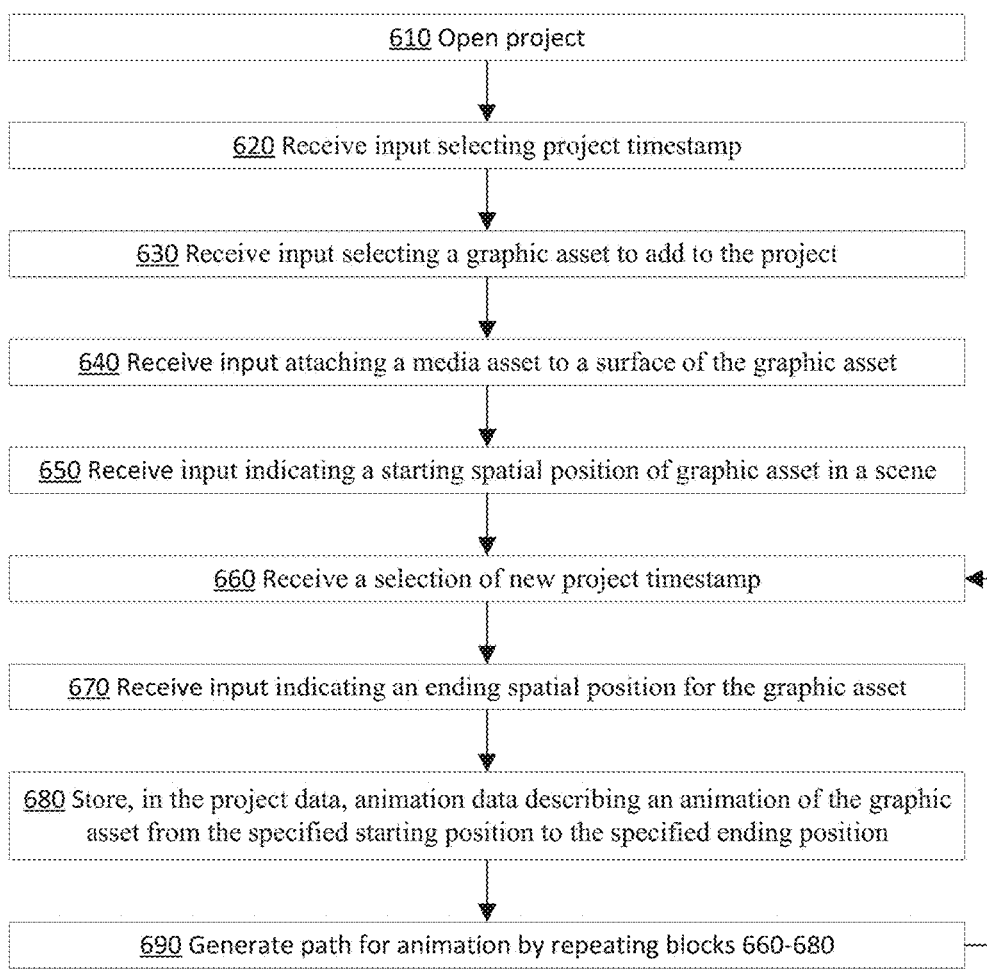
FIG. 6 illustrates an example flow for editing a media project with animated graphic assets.

FIG. 6 illustrates an example flow 600 for editing a media project with animated graphic assets, according to an embodiment. Block 610 comprises opening a project in a video editing application, as in blocks 405-410 of FIG. 4. Block 620 comprises receiving input selecting a timestamp within the project. For example, a current timestamp marker may be dragged to a timestamp of interest in a timeline view of the project. Block 630 comprises receiving input selecting a graphic asset to add to the project. For instance, a basic geometry such as a cube or sphere may be selected from a list of basic geometries. Or a complex user-defined animated three-dimensional geometry model may be selected from a library of shared graphic assets or imported from a user's local file system.

Block 640 comprises optionally receiving input attaching a media asset to a surface of the graphic asset. A user may, for example, click on a surface of the graphic asset, such as a side of a cube. The user may then select a media asset to attach to the surface in a manner such as described with respect to blocks 420 or 440 of FIG. 4. Or, as another example, the user may drag and drop an icon or thumbnail representing the media asset directly on to the surface without first selecting the surface. An association between the surface and the media asset may be stored in the project data. In an embodiment, editing operations may further be specified for the media asset, as described in other sections. In other embodiments, a project asset may be attached to the surface instead of a media asset.

Block 650 comprises receiving input indicating a set of starting spatial data (e.g., transformation being position, rotation and scale) of the graphic asset in a scene. For instance, the user may use a drag and drop operation to change the spatial data of the graphic asset at specific coordinates in a two dimensional or three dimensional space. Or, the user may explicitly input a set of coordinates. The GUI may then change the spatial data the graphic asset at the selected coordinates in the scene within the staging area. If a media asset was attached, the rendered media asset may be shown mapped to the surface of the graphic asset.

Block 660 comprises receiving a selection of a new project timestamp. For instance, the user may slide a current timestamp or progress marker on a project timeline to a new position. Or, the user may click on trick-play buttons to jump a specified amount of time forward. Or, the project may seek to a specific timestamp inputted by the user. If there are any differences in the viewable scene within the project between the previous timestamp and the newly selected timestamp, the scene within the staging area may optionally be updated to reflect the changes. For instance, if any animations have been defined, or if any of the media assets are playing media streams, these elements may be re-rendered accordingly. This re-rendering may require streaming at least a portion of any media stream(s) that are associated with the timestamp, including that of the media asset attached in block 640, if applicable, so as to identify and render the image frame that should be visible at the newly selected project timestamp.

Block 670 comprises receiving input indicating an ending spatial data for the graphic asset, in similar manner to block 650.

Block 680 comprises storing, in the project data, animation data describing an animation of the graphic asset from the specified starting spatial data to the specified ending spatial data. The starting spatial data is stored in association with the asset along with the timestamp selected in block 620. The ending spatial data is stored in association with the asset along with the timestamp selected in block 670.

Block 690, which is optional, comprises repeating blocks 660-680 for one or more additional spatial data and timestamps, so as to generate an interpolated "path" or other interpolated spatial data for the graphic asset.

The above process flow illustrates only one example of a process flow for creating an animation in a media project, and may involve other elements known in the art that are not depicted for simplification. Other flows may include additional, fewer, or alternative elements in varying arrangements. Any suitable animation techniques may be utilized for defining animations in the described video editing application, including more sophisticated techniques for defining spatial points along which an animation interpolation may be computed (i.e., "paths"). As another example, instead of specifying an ending time for the animation, a user may simply specify a movement speed and direction.

In an embodiment, upon defining an animation, the video editing application may automatically "play" the animation to the user by, for example, returning to the starting timestamp for the animation and rendering the scene through to the ending timestamp for the animation one or more times. In an embodiment, process flow 600 may be integrated with other tasks, such as sequencing media assets and defining edits to those media assets, as described with respect to flow 400. The animations may be overlaid or otherwise incorporated into the same scenes as the edited sequence of media assets.

4.4. Example Rendering of Animation

Figure 7:
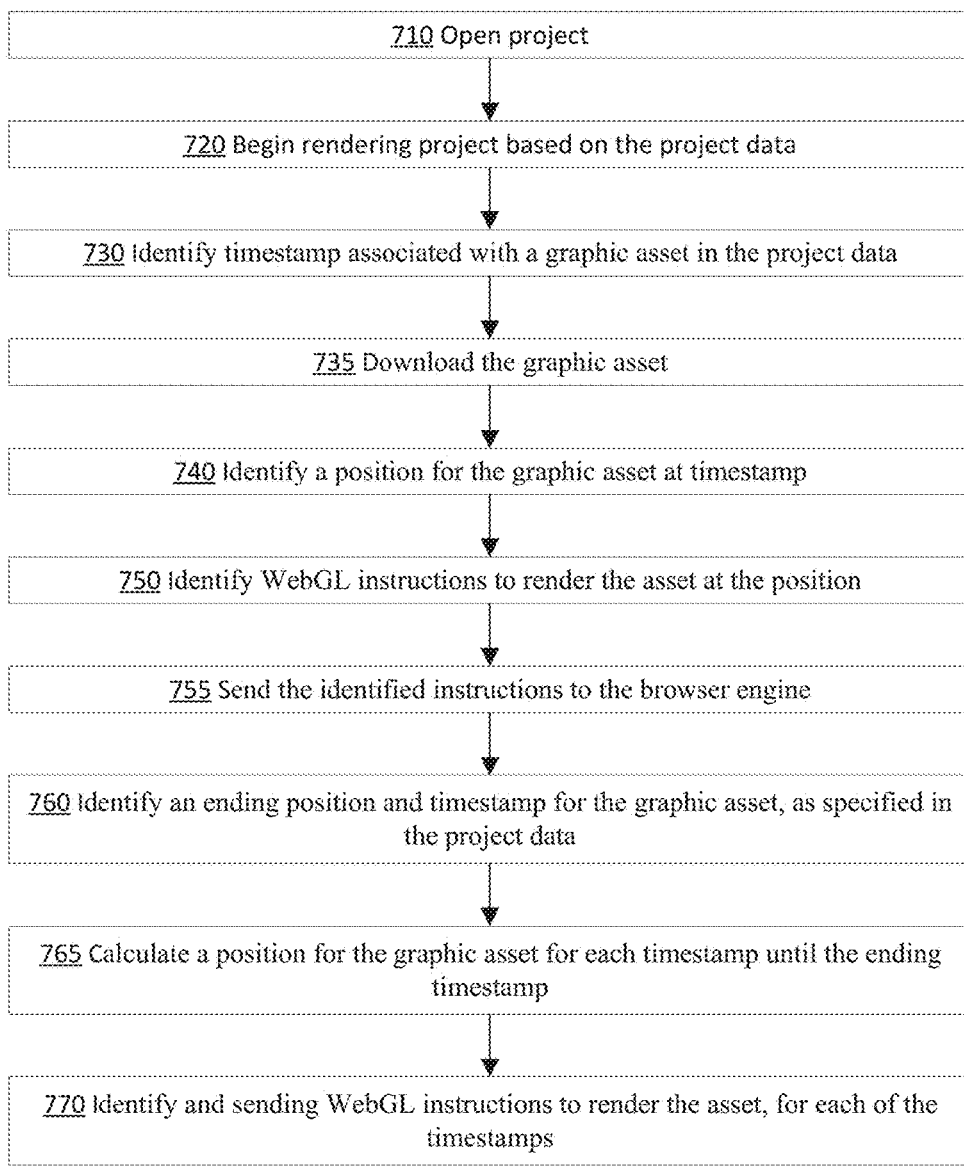
FIG. 7 illustrates an example flow for rendering an animation in a browser-based video rendering application.

FIG. 7 illustrates an example flow 700 for rendering an animation in a browser-based video rendering application, according to an embodiment. The animation may be, for example, the animation described in project data generated per flow 600 above. Block 710 comprises opening a project in a video rendering application, as in block 510 of FIG. 5.

Block 720 comprises beginning the rendering of the project based on the project data, using scheduling and rendering techniques such as described elsewhere herein.

Block 730 comprises identifying a timestamp associated with a graphic asset in the project data. Block 735 comprises downloading the graphic asset. Block 735 may actually have been performed prior to rendering the project, or performance of block 735 may be scheduled so as to download the graphic asset as the project is being rendered.

Block 740 comprises identifying spatial data (e.g., a position) for the graphic asset at the identified timestamp, as stored in the project data. The position may be, for instance, a coordinate within a two-dimensional or three-dimensional scene.

Block 750 comprises identifying WebGL instructions to render the asset at the position identified in block 740. Any suitable instructions may be utilized, including instructions to render surfaces of the asset to a texture space, render the texture space in a world space, and project the world space into a screen space. Other assets visible in the scene may also be rendered at the same time. The instructions may be stored in the downloaded graphic asset and/or determined dynamically based on data in the graphic asset.

Block 755 comprises sending the identified instructions to the browser engine.

Block 760 comprises identifying an ending position and timestamp for the graphic asset, as specified in the project data. Block 765 comprises calculating a position for the graphic asset for each timestamp until the ending timestamp, based on the starting position and timestamp, and the ending position and timestamp.

Block 770 comprises identifying and sending WebGL instructions to render the asset, for each of the timestamps, at the corresponding calculated position. The instructions need not necessarily fully render the graphic asset anew for each timestamp, particularly when the graphic asset does not include any internal animations that would affect the appearance of the graphic asset over time. Of course, various textures may need to be re-rendered to apply lighting from new angles or to update the playing image frame of an attached media asset. As a consequence of block 770, the graphic asset will appear to move across the scene from the starting position to the ending position.

The above process flow illustrates only one example of a process flow for rendering an animation in a media project, and may involve other elements known in the art that are not depicted for simplification. Other flows may include additional, fewer, or alternative elements in varying arrangements.

4.5. Example Rendering of Texture-Mapped Streaming Video

Figure 8:
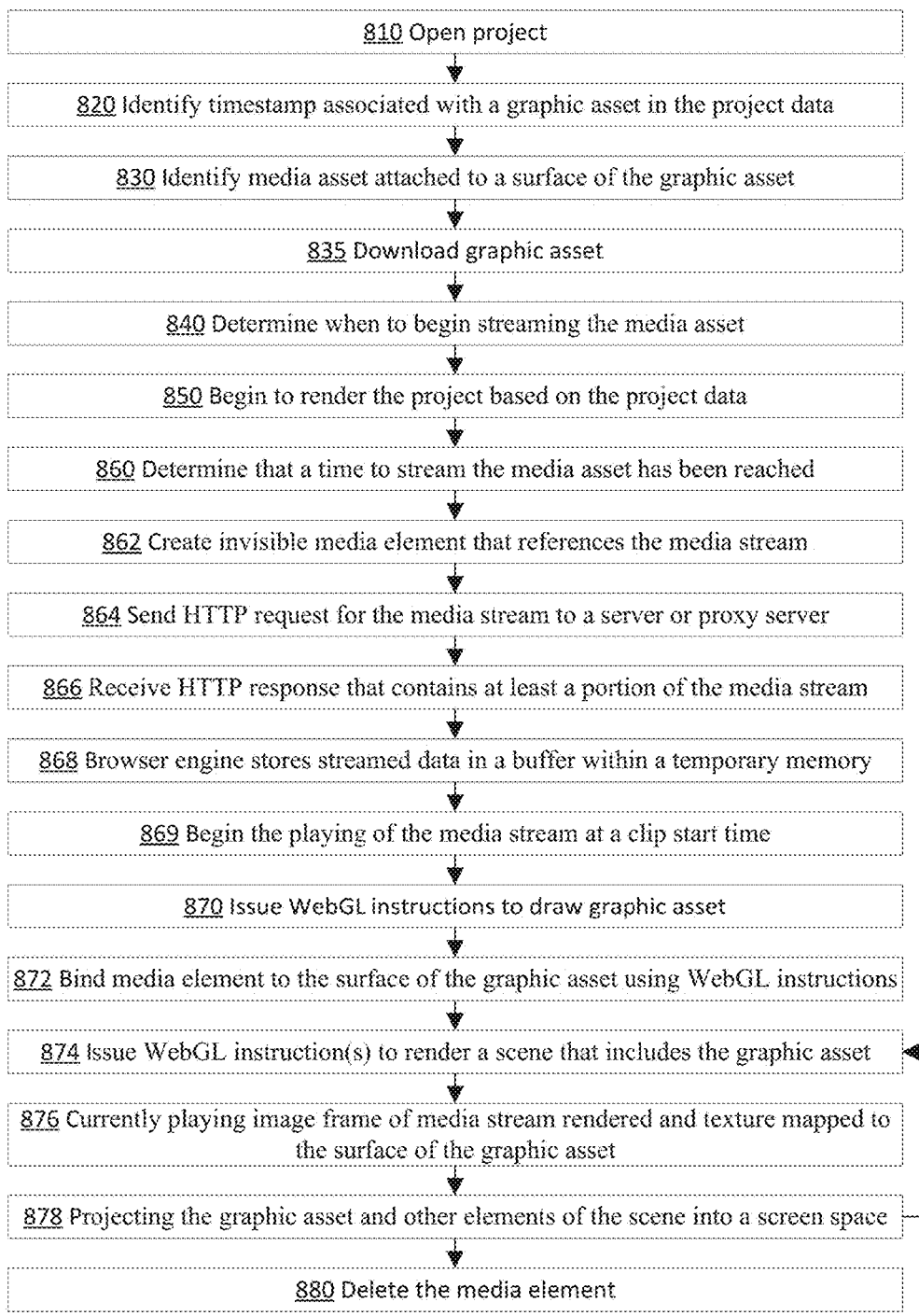
FIG. 8 illustrates an example flow for rendering a texture-mapped streaming video in a browser-based video rendering application.

FIG. 8 illustrates an example flow 800 for rendering a texture-mapped streaming video in a browser-based video rendering application, according to an embodiment. Flow 800 may be utilized, for example, to render a playing video on a face of an animated graphic asset during a process flow such as process flow 700 above. Flow 800 may also or instead be utilized in a variety of other contexts.

Block 810 comprises opening a project in a video rendering application, as in block 510 of FIG. 5. Block 820 comprises identifying a timestamp associated with a graphic asset in the project data. Block 830 comprises, based on the project data, identifying a media asset attached to a surface of the graphic asset.

Block 835 comprises downloading the graphic asset. Block 835 may, in some embodiments, actually be scheduled for performance after beginning the rendering of the project in block 850. Block 840 comprises determining when to begin streaming the media asset, using scheduling techniques such as described herein.

Block 850 comprises beginning to render the project based on the project data, using scheduling and rendering techniques such as described elsewhere herein.

Block 860 comprises determining that a time to stream the media asset has been reached. The time may be exactly the originally scheduled time, or the scheduler may adjust the time based on how quickly other rendered assets are being downloaded.

Block 862 comprises creating an invisible media element that references the media stream for the media asset. For example, the video rendering application may add a HTML5 video element to the DOM. This causes a browser engine to, in block 864, send a HTTP request for the media stream to a server that hosts the media stream or a proxy server. In block 866, a HTTP response is received that contains at least a portion of the media stream. Block 868 comprises the browser engine storing the data received in block 866 in a buffer within a temporary memory. Blocks 864-868 may be repeated until the HTTP response in block 866 indicates that no media stream data is left to retrieve. Block 869 comprises beginning the playing of the media stream at a clip start time, which may involve seeking through the buffer if necessary. Block 869 is performed at a time, relative to the project timeline, when the media asset is to be played.

Block 870 comprises issuing WebGL instructions to draw the graphic asset. Block 872 comprises binding the media element to the surface of the graphic asset using WebGL instructions. Block 874, which may first be performed at approximately the same time as block 869, comprises issuing WebGL instructions to render a scene that includes the graphic asset. Block 876 comprises the browser engine causing the currently playing image frame of the media stream to be rendered and texture mapped to the surface of the graphic asset. Block 878 comprises projecting the graphic asset and other elements of the scene into a screen space.

From block 878, if there are still image frames within the video data that will include the graphic asset, flow returns to block 874. Otherwise flow proceeds to block 880.

Block 880 comprises deleting the media element when the media stream has completed or the graphic asset is no longer present, thus freeing room on the DOM for adding other media elements to stream other media assets.

The above process flow illustrates only one example of a process flow for texture mapping a streaming media asset to a face of a graphic asset in a project, and may involve other elements known in the art that are not depicted for simplification. Other flows may include additional, fewer, or alternative elements in varying arrangements.

In an embodiment, an edited sequence of assets (e.g. a project) may be mapped to an arbitrary geometry, instead of just a single media asset. In such embodiments, a flow may comprise rendering the edited sequence, using techniques such as described above, but to a temporary buffer. The flow may further comprise reading the rendered video data from the temporary buffer, possibly even as subsequent portions of the edited sequence are still being rendered, and then playing the rendered video data to the surface of the graphic asset. For instance, the temporary buffer may be bound to the surface in the same manner as the media element described above, and then played.

4.6. Example Browser-Based Scheduling Flow

Figure 9:
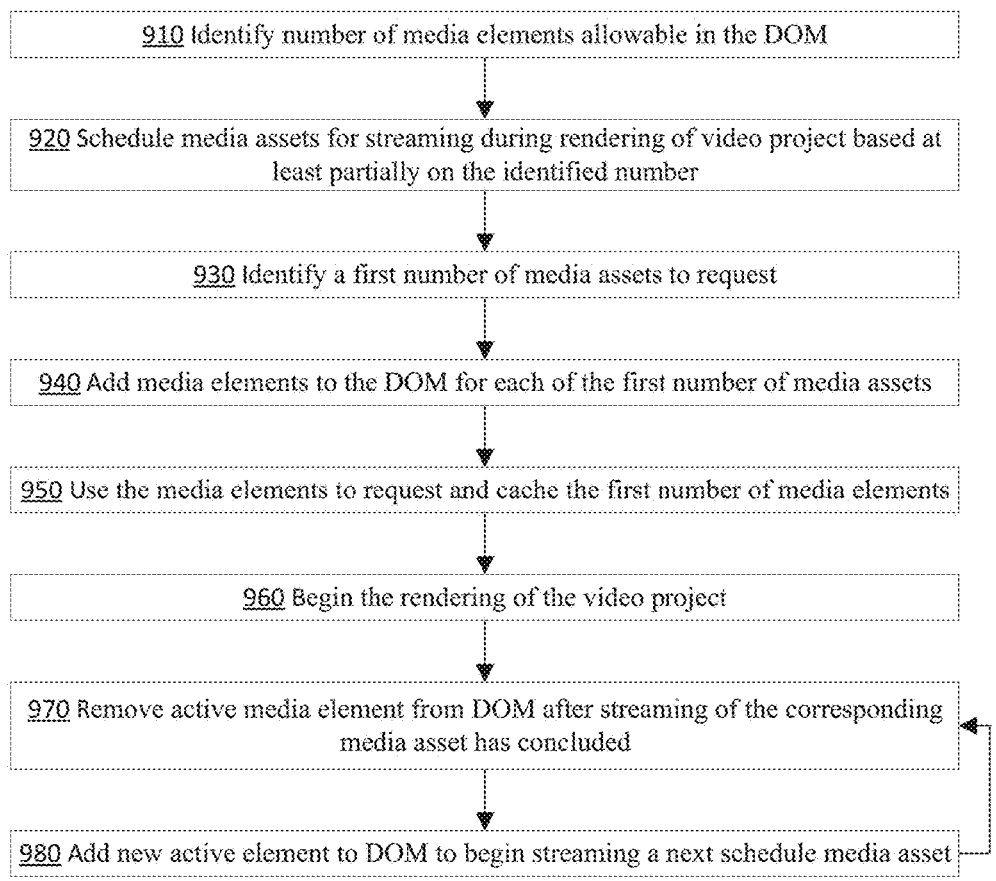
FIG. 9 illustrates an example flow for scheduling media assets for streaming during the rendering of a media project within a browser-based environment.

FIG. 9 illustrates an example flow 900 for scheduling media assets for streaming during the rendering of a media project within a browser-based environment, according to an embodiment. Flow 900 may be utilized, for example, in conjunction with any of the rendering techniques described herein.

Block 910 comprises identifying a number of media elements that the browser engine executing the video rendering application will allow in the DOM. The number may be hard-coded based on the browser user agent, queried from the browser engine, or determined programmatically by testing to see how many active media elements can be added. Block 920 comprises, based at least partially on the identified number, scheduling media assets for streaming during the rendering of a project, such as described in other sections. Block 930 comprises identifying a first number of media assets to request, the first number being less than or equal to the number of allowable media elements identified in block 910.

Block 940 comprises adding media elements to the DOM for each of the first number of media assets. Block 950 comprises using the media elements to request and cache media streams for the first number of media assets. Block 960 comprises beginning the rendering of the project, as described in other sections.

Block 970, which may occur as blocks 950-960 are ongoing, comprises removing an active media element from the DOM after the streaming of the corresponding media asset has concluded. As described in other sections, this may comprise simply deactivating the element, such that the element is no longer streaming data. This may also or instead comprise deleting the element when the data cached in the element is no longer needed for rendering. Block 980 comprises adding a new active media element to the DOM to begin streaming a next scheduled media asset. Flow may proceed back to block 970 as long as additional media assets remain to be streamed and rendering is continuing.

The above process flow illustrates only one example of a process flow for scheduling the retrieval of streaming media assets, and may involve other elements known in the art that are not depicted for simplification. Other flows may include additional, fewer, or alternative elements in varying arrangements.

4.7. Example Proxy Server Flow

Figure 10:
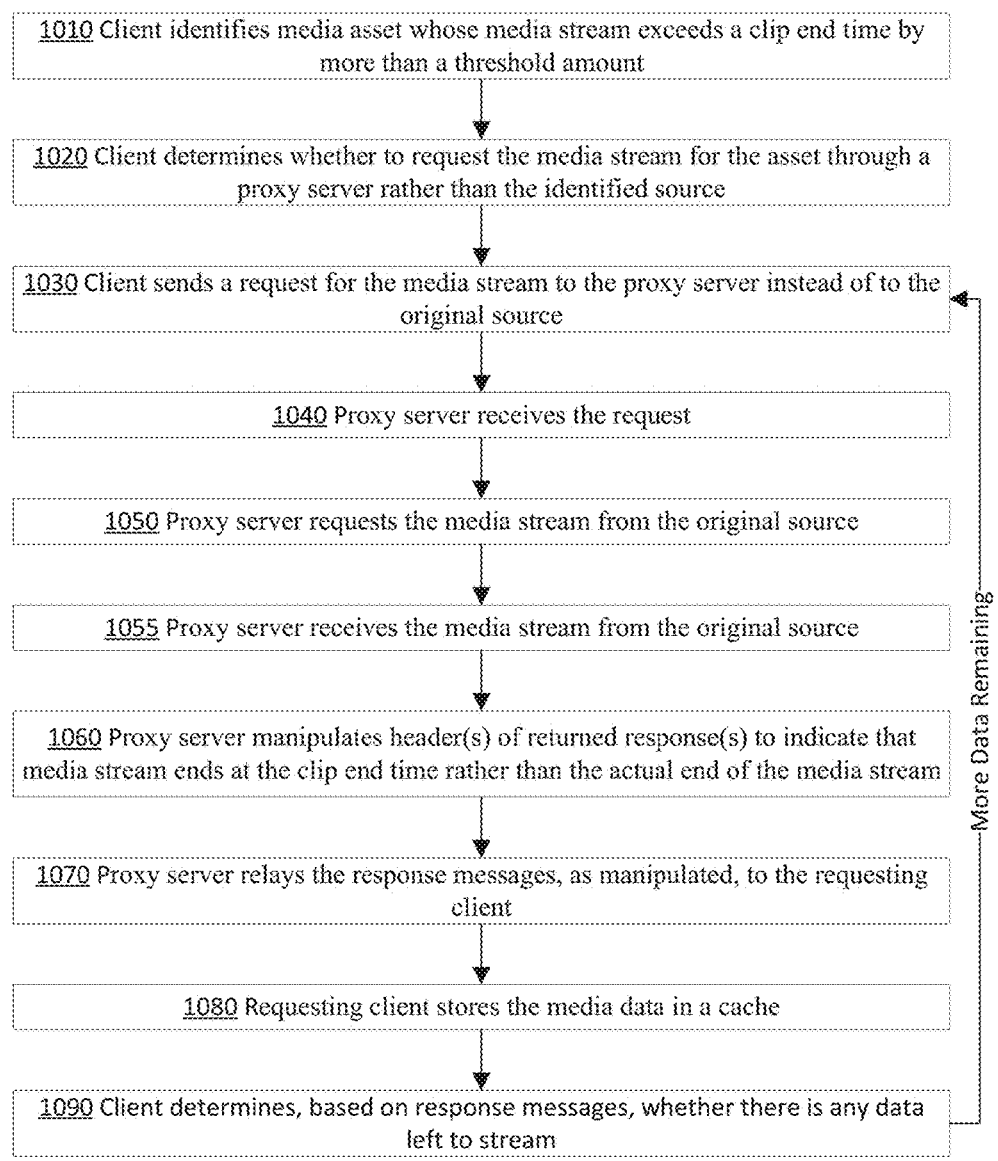
FIG. 10 illustrates an example flow for utilizing a proxy server to stream media assets during the rendering a media project within a browser-based environment.

FIG. 10 illustrates an example flow 1000 for utilizing a proxy server to stream media assets during the rendering of a media project within a browser-based environment, according to an embodiment.

Block 1010 comprises a client identifying a media asset whose media stream exceeds a clip end time by more than a threshold amount. For instance, a media asset may be associated with a media stream that is ten minutes long, but the project data may describe an edit to the media stream that trims the media stream to a clip ending point at three minutes. Certain browser engines, if left to cache the media stream using their built-in streaming logic, would nonetheless stream and cache the remaining seven minutes of the media stream, which would greatly increase the amount of memory that would need to be allocated to retrieve the stream.

Block 1020 comprises the client determining whether to request the media stream for the asset through a proxy server rather than the identified source. The determination may be made based not only on the fact that the media stream exceeds a clip end time, but also based on the scheduling needs of the system. For instance, it may not matter that too much data will be streamed if the client has plenty of time and resources to cache the data, or if the media asset is the last asset in the project. It also may be unnecessary to request a stream from a proxy server if the original source is configured to honor requests to stop streaming at a certain point. In an embodiment, a proxy server is only used when the media stream is hosted by a third-party source.

Block 1030 comprises the client sending a request for the asset's media stream to the proxy server instead of to the original source identified by the media asset. The request includes a parameter specifying the URL of the media stream at the original source, or any other suitable identifying data. The request further includes a parameter requesting to seek to a specified clip start point, if relevant, and a parameter specifying an amount of data that the client would like streamed from that clip start time. The parameters may be embedded in, for example, a query string or HTTP header. In an embodiment, the parameters may be encrypted.

Block 1040 comprises the proxy server receiving the request. Block 1050 comprises the proxy server requesting the media stream from the original source. The proxy server may request that the original source seek to a point of time before the clip start time, if seek requests are supported by the original source.

Block 1055 comprises the proxy server receiving the media stream from the original source. The media stream may be received in one or more responses from the original source. If the original source does not support seeking, the proxy server may ignore any media data that precedes the clip start time, if a clip start time has been specified.

Block 1060 comprises the proxy server manipulating header(s) of the returned response(s) to indicate that the media stream ends at the clip end time rather than at the actual end of the media stream. This may entail, for example, manipulating a parameter in each returned response that indicates how much data is remaining, so as to subtract the difference between the clip end time and the end of the media stream. Or, this may entail letting most headers pass-through without changes, but manipulating the header of the response that includes the video data for the clip end time to indicate that no more data remains in the stream.

Block 1070 comprises the proxy server relaying the response message(s), as manipulated, to the requesting client. Block 1080 comprises the requesting client storing the media data in a cache.

Block 1090 comprises the client data determining whether any data remains for the media stream. If so, flow returns to block 1030. Otherwise, the flow is complete.

The above process flow illustrates only one example of a process flow for utilizing a proxy server, and may involve other elements known in the art that are not depicted for simplification. Other flows may include additional, fewer, or alternative elements in varying arrangements. In an embodiment, the proxy server is configured to perform additional processing on the media stream, including transcoding, applying special effects, and so forth.

5.0. Example Embodiments

Examples of some embodiments are represented, without limitation, in the following clauses:

According to an embodiment, a method comprises: accessing, at a client device, project data describing a media project that associates assets with timespans in a project timeline, the assets including at least streaming media assets; rendering, at the client device, video data for the media project, the streaming media assets being rendered during their associated timespans in the video data; as the video data for the media project is being rendered, the client device streaming, from a network streaming source, first media for at least a first streaming media asset of the streaming media assets; and playing the rendered video data; wherein the method is performed by one or more computing devices.

In an embodiment, the method further comprises concurrently with the streaming and the rendering of the video data for the media project, playing the rendered video data in real-time at the client device.

In at least some of the above embodiments, the project data describes at least a first editing operation for the first streaming media asset, and the method further comprises the client device dynamically applying the first editing operation to the first media as the first media is being streamed. In at least some of the above embodiments, the first editing operation is an image effect. In at least some of the above embodiments, the first editing operation is a trimming operation, wherein applying the first editing operation comprises seeking the first media to a clip start time specified by the project data, the seeking comprising issuing a streaming request to the network streaming sources for a specific data range within the first media and/or streaming the first media up to the clip start time in the background prior to a time in the project timeline when the first media asset is to be rendered.

In at least some of the above embodiments, the method further comprises rendering two or more of the streaming media assets concurrently within the video data, the two or more of the streaming media assets being streamed concurrently to the client device.

In at least some of the above embodiments, the method further comprises identifying amounts of buffer time needed for buffering at least portions of media for the streaming media assets prior to rendering the timespans of video data associated with the streaming media assets, so as to ensure that the rendered video data is playable in real-time during said rendering; and scheduling times during the rendering to begin streaming media for the streaming media assets to buffers based on the identified amounts of buffer time and at least one of: a memory constraint, a bandwidth constraint or a network constraint such as latency or seeking times.

In at least some of the above embodiments, the scheduling comprises calculating predicted streaming times and/or seek times for the streaming media assets using metrics of actual streaming times and/or seek times, the metrics having been collected with respect to media streamed during previous renderings of video data at the client device and/or one or more additional client devices, the amounts of buffer time being based on the calculated predicted streaming times and/or seek times.

In at least some of the above embodiments, the method further comprises identifying a limit on a number of a streams that may be streamed to the client device concurrently; wherein the scheduling comprises generating a schedule of the times to begin streaming media for the streaming media assets that avoids surpassing the limit on the number of the streams that may be streamed concurrently. In at least some of the above embodiments, the limit is a number of actively streaming media elements that may concurrently exist in a document object model for a document into which the video data is being rendered, wherein the scheduling further comprises scheduling times to add actively streaming media elements to the document object model and deactivate previously actively streaming media elements.

In at least some of the above embodiments, the method further comprises sending a streaming request to the networking streaming source, the streaming request including a first parameter instructing the network streaming source to only send a certain amount of data from the first media, the first media asset specifying that only a clip of the first media is to be used; calculating the certain amount of data based on the length of the clip and/or a buffer size predicted to be needed for the first media to maintain playing of the rendered video data in real-time as the first media asset is being rendered.

In at least some of the above embodiments, the method further comprises, responsive to determining that an original source of the first media is configured to ignore the first parameter, determining to send the streaming request to the network streaming source instead of the original source, the network streaming source being a proxy server configured to relay the first media from the original source to the client device.

In at least some of the above embodiments, the method further comprises, as the video data for the media project is being rendered, the client device streaming media for multiple assets from different network streaming sources.

In at least some of the above embodiments, the method further comprises, as the video data for the media project is being rendered, the client device streaming media for multiple assets in different formats.

In at least some of the above embodiments, the media project associates a plurality of assets with timespans in the project timeline, the plurality of assets including both graphic assets and media assets; wherein rendering the video data for the media project comprises rendering the graphic assets during their associated timespans in the project timeline. In at least some of the above embodiments, at least one of the graphic assets comprises an animated three-dimensional geometry. In at least some of the above embodiments, rendering the video data comprises rendering at least one of the graphic assets over the first media of the first streaming media asset. In at least some of the above embodiments, rendering the graphic assets comprises drawing the graphic assets using WebGL instructions.

In at least some of the above embodiments, the media project specifies spatial layout information for the plurality of assets in a three-dimensional space; and rendering the video data for the media project comprises projecting renderings of the plurality of assets into a two-dimensional screen space based on the spatial layout information.

In at least some of the above embodiments, the method further comprises: prior to the rendering, presenting a video editing interface at the client device; receiving editing input via the video editing interface that arranges the plurality of assets in a scene; storing spatial layout information for the plurality of assets in the project data; rendering the video data for the media project responsive to a request via the video editing interface to play the media project; wherein rendering the video data for the media project comprises projecting renderings of the plurality of assets into a two-dimensional screen space based on the spatial layout information.

In at least some of the above embodiments, the method further comprises: prior to the rendering, presenting a video editing interface at the client device; receiving, at the client, from the server, a listing of available graphic assets that are available for inclusion in the media project; receiving editing input via the video editing interface that selects the graphic assets to include in the media project from the listing; downloading the selected graphic assets from the server; rendering the video data for the media project responsive to a request via the video editing interface to play the media project.

In at least some of the above embodiments, the method further comprises: prior to the rendering, presenting a video editing interface at the client device; receiving editing input via the video editing interface that selects the streaming media assets for inclusion in the media project and associates the streaming media assets with the corresponding timespans in the project timeline; and rendering the video data for the media project responsive to a request via the video editing interface to play the media project.

In at least some of the above embodiments, the method further comprises: prior to the rendering, presenting a video editing interface at the client device; receiving editing input via the video editing interface that defines the media project; creating the project data responsive to the editing input; uploading the media project to a server system configured to share the project data with one or more other client devices.

In at least some of the above embodiments, rendering the video data comprises: playing at least a portion of the first media; mapping the playing portion of the first media to a surface of a geometry in a three-dimensional space; and projecting the geometry with the mapped and playing portion of the first media into a two-dimensional screen space.

In at least some of the above embodiments, rendering the video data comprises: adding a video element to a document object model, the video element referencing the first media, the video element configured to cause the streaming of the first media; issuing one or more WebGL drawing instructions to create a geometry in a three-dimensional space; issuing one or more WebGL instructions to bind the video element to the geometry as a texture; playing the video element; issuing one or more WebGL instructions to render the geometry, including the texture.

In at least some of the above embodiments, the method further comprises: receiving live editing input specifying one or more edits to the media project while rendering and playing the rendered video data; updating the project data responsive to the one or more edits; after receiving the live editing input, continuing the rendering of the video data based on the updated project data to include the one or more edits.

In at least some of the above embodiments, the method further comprises: rendering an edited sequence that includes the first media asset and the second media asset; playing at least a portion of the rendered sequence; texture mapping the playing portion of the rendered sequence to a surface of a three-dimensional geometry in a three-dimensional space; wherein the media project specifies spatial layout information for the assets in a three-dimensional space; and projecting the geometry with the mapped and playing portion of the rendered sequence into a two-dimensional screen space.

In at least some of the above embodiments, the rendering and the playing are responsive to a request for a real-time playback of the media project, and the video data is non-frame-accurate. The method further comprises: subsequent to the rendering and playing, receiving a request for a non-real-time playback of the media project; responsive to the request for the non-real-time playback, based on the project data, rendering a frame accurate video data for the media project at the client device.

In at least some of the above embodiments, the method further comprises the client device executing a browser-based application that instructs the client device to perform any of the above methods.

According to an embodiment, a method comprises: sending listing information to client devices that lists assets in an asset repository, the assets including streaming media assets; streaming media for the streaming media assets to the client devices responsive to streaming requests from the client devices; sending, to the client devices, application instructions that, when executed by a given client device of the client devices, cause the given client device to: implement a video editing interface for creating a video editing project comprising selected assets from the asset repository; receive input for creating the video editing project; request the selected assets from the asset repository, said requesting including requesting media streams for selected streaming media assets from the asset repository; and render the video editing project at the given client device as video data that depicts the selected assets, including the streaming media assets.

In at least some of the above embodiments, the method further comprises storing, in the asset repository, project data for video editing projects created at the client devices via the video editing interface, the assets including the video editing projects, the project data shareable with multiple client devices.

In at least some of the above embodiments, the method further comprises storing, in the asset repository, graphic assets, the graphic assets including animated three-dimensional geometries that are renderable in accordance with the application instructions.

In at least some of the above embodiments, the method further comprises: receiving proxy requests for certain streaming media at a proxy server, the proxy requests including parameters that specify third-party sources for the certain streaming media and amounts of data needed for the certain streaming media; relaying the certain streaming media through the proxy server in response to the proxy requests; at the proxy server, manipulating certain headers for the relayed streaming media, based on the amounts of data specified in the parameters, to indicate that no more streaming media is available; wherein the application instructions are configured to cause certain client devices to request the certain streaming media for certain streaming media assets from the proxy server instead of from the third-party sources.

In at least some of the above embodiments, the application instructions are further configured to, when executed by the given client device of the client devices, cause the given client device to play the rendered video data as the rendered video data is being rendered and as the media streams for the selected streaming media assets are being streamed.

In at least some of the above embodiments, the application instructions are further configured to, when executed by the given client device of the client devices, cause the given client device to: receiving editing input via the video editing interfaces specifying an editing operation to at least one streaming media asset; and apply the editing operation to the at least one streaming media asset as the rendered video data is being rendered and as the at least one streaming media asset is being streamed.

In at least some of the above embodiments, the method further comprises receiving uploads of the streaming media assets from the client devices, wherein the application instructions are further configured to, when executed by the given client device of the client devices, cause the given client device to transcode the streaming media assets prior to upload.

In at least some of the above embodiments, the application instructions are coded in HTML and JavaScript, the client devices being configured to execute the application instructions in a web browser.

A system comprising: an asset repository comprising a plurality of assets, including streaming media assets; a streaming server configured to stream the streaming media assets responsive to requests for the streaming media assets; client devices configured to: render video data for media projects comprising the streaming media assets; stream media for the streaming media assets from the streaming server while the video data for the media projects that comprise the streaming media assets are being rendered; concurrently with streaming the media for the streaming media assets and rendering the video data for the media projects, playing the rendered video data in real-time.

In at least some of the above embodiments, the system further comprises a transaction server configured to conduct transactions with the client devices to sell licenses to purchasable assets in the plurality of assets.

In at least some of the above embodiments, the system further comprises a proxy server configured to relay media streams for third-party streaming media assets from one or more third-party servers to the client devices, the proxy server further configured to manipulate at least some of the relayed media streams.

In at least some of the above embodiments, the client devices are further configured to apply editing operations and/or special effects operations to the media streamed by the streaming server during said rendering and playing of the rendered video data in real-time.

In at least some of the above embodiments, the plurality of assets include graphic assets, the graphic assets including animated three-dimensional geometries that are renderable by the client devices in the rendered video data.

In at least some of the above embodiments, the client devices are further configured to present video editing interfaces for creating the media projects and send project data describing the created media projects to a server for storage in the asset repository.

In at least some of the above embodiments, the system further comprises an application server configured to send listings of assets in the asset repository to the client devices, the client devices configured to present video editing interfaces for creating the media projects by selecting specific assets in the asset repository to include in the media projects.

In at least some of the above embodiments, the system further comprises an application server configured to send browser-based application logic to the client devices that, when executed by the client devices, causes the client devices to performing said rendering, streaming, and playing.

Other examples of these and other embodiments are found throughout this disclosure.

6.0. Implementation Mechanism

Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 11:
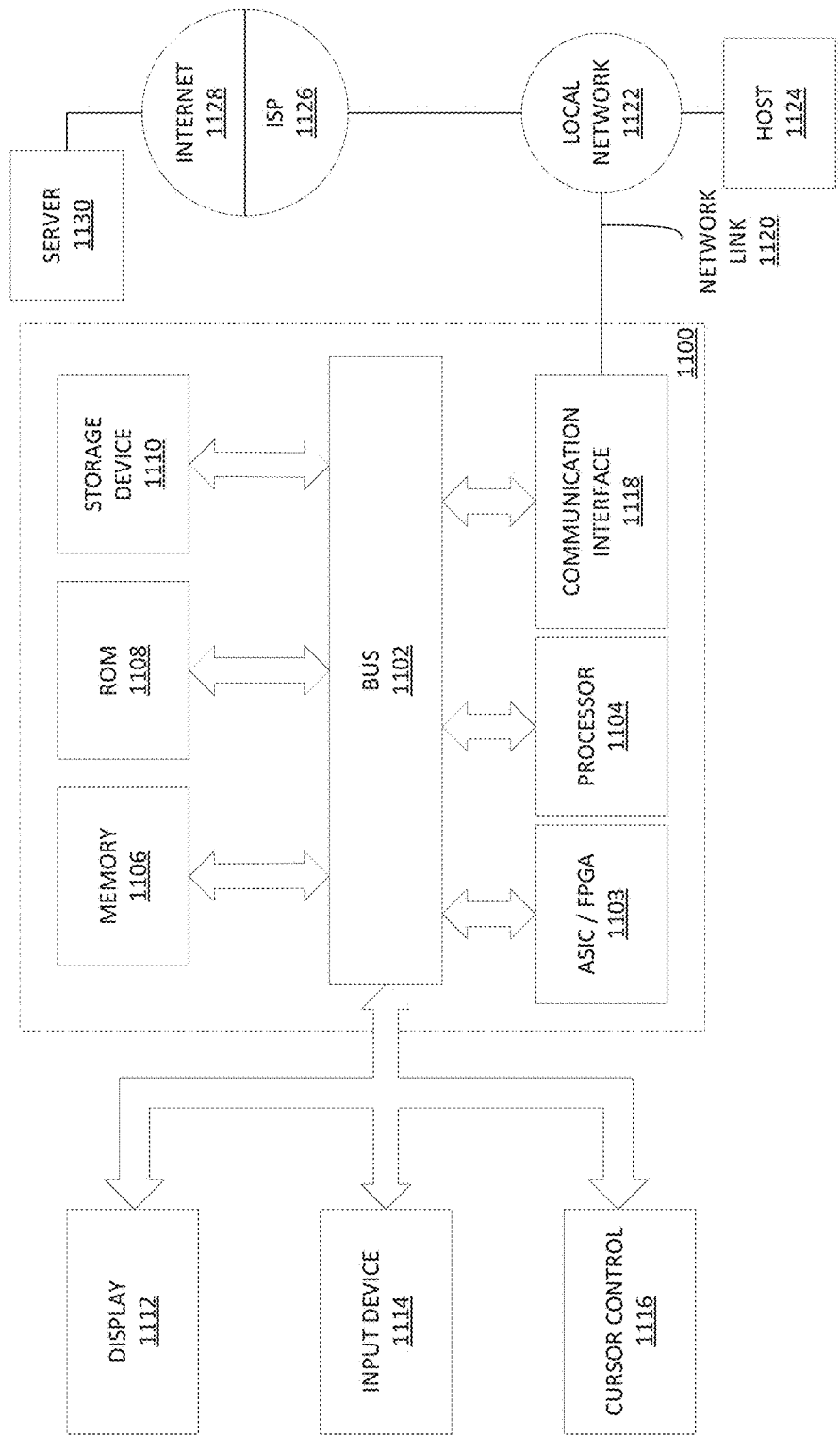
FIG. 11 is block diagram of a computer system upon which embodiments of the invention may be implemented.

FIG. 11 is a block diagram that illustrates a computer system 1100 utilized in implementing the above-described techniques, according to an embodiment. Computer system 1100 may be, for example, a desktop computing device, laptop computing device, tablet, smartphone, server appliance, computing mainframe, multimedia device, handheld device, networking apparatus, or any other suitable device.

Computer system 1100 includes one or more busses 1102 or other communication mechanism for communicating information, and one or more hardware processors 1104 coupled with busses 1102 for processing information. Hardware processors 1104 may be, for example, a general purpose microprocessor. Computer system 1100 may also include one or more ASICs or FPGAs 1103 coupled with busses 1102 for implementing various portions of the logics and instructions described herein in hardware. Busses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes a main memory 1106, such as a random access memory (RAM) or other dynamic or volatile storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, is provided and coupled to bus 1102 for storing information and instructions.

Computer system 1100 may be coupled via bus 1102 to one or more displays 1112 for presenting information to a computer user. For instance, computer system 1100 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1112.

In an embodiment, output to display 1112 may be accelerated by one or more graphics processing unit (GPUs) in computer system 1100. A GPU may be, for example, a highly parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance. Various other computing tasks may be off-loaded from the processor 1104 to the GPU.

One or more input devices 1114 are coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In an embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

A computer system 1100 may implement techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

A computer system 1100 may also include, in an embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As yet another example, the one or more communication interfaces 1118 may include a wireless network interface controller, such as a 802.11-based controller, Bluetooth controller, Long Term Evolution (LTE) modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a Service Provider 1126. Service Provider 1126, which may for example be an Internet Service Provider (ISP), in turn provides data communication services through a wide area network, such as the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

In an embodiment, computer system 1100 can send messages and receive data, including program code and/or other types of instructions, through the network(s), network link 1120, and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a processor 1104, possibly via an operating system and/or other intermediate layers of software components.

In an embodiment, some or all of the systems described herein may be or comprise server computer systems, including one or more computer systems 1100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when executed by one or more computing devices, cause:
   accessing, at a client device, project data describing a media project that associates assets with timespans in a project timeline, the assets including at least a first streaming media asset;
   rendering, at the client device, video data for the media project, the assets being rendered during their associated timespans in the video data;
   as the video data for the media project is being rendered, the client device streaming, from a network streaming source, first media for at least the first streaming media as set;
   concurrently with the streaming and the rendering of the video data for the media project, playing the rendered video data in real-time at the client device;
   identifying amounts of buffer time needed for buffering at least portions of media for particular streaming media assets, of the assets, prior to rendering particular timespans of video data associated with the particular streaming media assets, so as to ensure that the rendered video data is playable in real-time during said rendering;
   scheduling times during the rendering to begin streaming media for the particular streaming media assets to buffers based on the identified amounts of buffer time and at least one of: a memory constraint, a bandwidth constraint, or a network constraint.

2. The one or more non-transitory computer-readable media of claim 1, wherein the project data describes at least a first editing operation for the first streaming media asset, wherein the instructions, when executed by the one or more computing devices, further cause the client device to dynamically apply the first editing operation to the first media as the first media is being streamed.

3. The one or more non-transitory computer-readable media of claim 1, wherein the instructions, when executed by the one or more computing devices, further cause calculating predicted streaming times and/or seek times for the particular streaming media assets using metrics of actual streaming times and/or seek times, the metrics having been collected with respect to media streamed during previous renderings of video data at the client device and/or one or more additional client devices, the amounts of buffer time being based on the calculated predicted streaming times and/or seek times.

4. The one or more non-transitory computer-readable media of claim 1, wherein the instructions, when executed by one or more computing devices, further cause:
   identifying a limit on a number of a streams that may be streamed to the client device concurrently;
   wherein the scheduling comprises generating a schedule of the times to begin streaming media for the particular streaming media assets that avoids surpassing the limit on the number of the streams that may be streamed concurrently.

5. The one or more non-transitory computer-readable media of claim 4, wherein the limit is a number of actively streaming media elements that may concurrently exist in a document object model for a document into which the video data is being rendered, wherein the scheduling further comprises scheduling times to add actively streaming media elements to the document object model and deactivate previously active streaming media elements.

6. The one or more non-transitory computer-readable media of claim 4, wherein the identified amounts of buffer time needed for buffering so as to ensure that the rendered video data is playable in real-time comprise a first predicted amount of time needed to buffer the first media in view of: a duration and bitrate of second media for a second streaming media asset in the project, as well as an amount of memory available for buffering the first media and the second media.

7. The one or more non-transitory computer-readable media of claim 1, wherein the instructions, when executed by one or more computing devices, further cause:
   in accordance with the scheduling, sending a first streaming request to the network streaming source at a first scheduled time, the first streaming request including a first parameter instructing the network streaming source to only send a first amount of data from the first media;
   calculating the first amount of data based at least on a first buffer size predicted to be needed for the first media to maintain playing of the rendered video data in real-time as the first streaming media asset is being rendered;
   further in accordance with the scheduling, sending a second streaming request to the network streaming source at a second scheduled time subsequent to the first scheduled time, the second streaming request including a second parameter instructing the network streaming source to only send a second amount of data from the first media.

8. The one or more non-transitory computer-readable media of claim 7, wherein the network streaming source is a proxy server, further comprising:
  responsive to determining that an original source of the first media is configured to ignore the first parameter, determining to send the first streaming request to the proxy server instead of the original source, the proxy server configured to relay the first media from the original source to the client device.

9. The one or more non-transitory computer-readable media of claim 1,
  wherein the assets include both graphic assets and media assets;
  wherein rendering the video data for the media project comprises rendering the graphic assets during their associated timespans in the project timeline;
  wherein at least one of the graphic assets comprises an animated three-dimensional model rendered over the first media of the first streaming media asset.

10. The one or more non-transitory computer-readable media of claim 9, wherein the instructions, when executed by one or more computing devices, further cause:
  prior to the rendering, presenting a video editing interface at the client device;
  receiving editing input via the video editing interface that arranges the assets in a scene;
  storing spatial layout information for the assets in the project data;
  rendering the video data for the media project responsive to a request via the video editing interface to play the media project;
  wherein rendering the video data for the media project comprises projecting renderings of the assets into a two-dimensional screen space based on the spatial layout information.

11. The one or more non-transitory computer-readable media of claim 1,
  wherein rendering the video data comprises:
    playing at least a portion of the first media;
    texture mapping the playing portion of the first media to a surface of a three-dimensional geometry in a three-dimensional space;
    wherein the media project specifies spatial layout information for the assets in the three-dimensional space; and
    projecting the geometry with the mapped playing portion of the first media into a two-dimensional screen space.

12. The one or more non-transitory computer-readable media of claim 1, wherein the particular streaming media assets include the first streaming media asset and a second streaming media asset corresponding to second media, wherein rendering the video data comprises:
  rendering an edited sequence that includes the first streaming media asset and the second media streaming asset;
  playing at least a portion of the rendered sequence;
  texture mapping the playing portion of the rendered sequence to a surface of a three-dimensional geometry in a three-dimensional space;
  wherein the media project specifies spatial layout information for the assets in the three-dimensional space; and
  projecting the geometry with the mapped playing portion of the rendered sequence into a two-dimensional screen space.

13. The one or more non-transitory computer-readable media of claim 1, wherein the instructions, when executed by one or more computing devices, further cause:
  receiving live editing input specifying one or more edits to the media project while rendering and playing the rendered video data;
  updating the project data responsive to the one or more edits;
  after receiving the live editing input, based on the updated project data, recalculating the scheduled times and continuing the rendering of the video data to include the one or more edits.

14. The one or more non-transitory computer-readable media of claim 1, wherein the instructions are instructions for executing a browser-based application.

15. The one or more non-transitory computer-readable media of claim 1, wherein playing the rendered video data in real-time comprises playing the rendered video data in reverse, the scheduling comprising scheduling times to request discrete segments of the first media in a reverse order relative to an order in which the segments are found in the first media.

16. The one or more non-transitory computer-readable media of claim 1, wherein the scheduling comprises scheduling individual requests for discrete segments of two or more different media streams in alternation.

17. The one or more non-transitory computer-readable media of claim 1, further comprising determining not to schedule requests for certain lower priority assets within the media project.

18. The one or more non-transitory computer-readable media of claim 1, further comprising scheduling a portion of the media project to be rendered in a non-real time manner into a media cache in advance of a time when that portion will be needed for playback.

19. The one or more non-transitory computer-readable media of claim 1, further comprising adjusting the times based on how quickly the first media is being downloaded.

20. The one or more non-transitory computer-readable media of claim 1, wherein at least a portion of the first streaming media asset is rendered concurrently within the video data with at least a portion of a second streaming media asset, the first media having been scheduled for streaming at a different time than second media for the second streaming media asset.

21. A system comprising:
  an asset repository comprising a plurality of assets, including streaming media assets and graphic assets, the graphic assets including animated three-dimensional geometries;
  a streaming server configured to stream the streaming media assets responsive to requests for the streaming media assets;
  client devices configured to:
    present video editing interfaces for creating media projects;
    send project data describing the created media projects to a server for storage in the asset repository;
    render video data for the media projects comprising the streaming media assets and the animated three-dimensional geometries;
    stream media for the streaming media assets from the streaming server while the video data for the media projects that comprise the streaming media assets are being rendered;

concurrently with streaming the media for the streaming media assets and rendering the video data for the media projects, play the rendered video data in real-time;

identify amounts of buffer time needed for buffering at least portions of media for the streaming media assets prior to rendering particular timespans of video data associated with the streaming media assets, so as to ensure that the rendered video data is playable in real-time during said rendering;

schedule times during the rendering to begin streaming media for the streaming media assets to buffers based on the identified amounts of buffer time and at least one of: a memory constraint, a bandwidth constraint, or a network constraint;

an application server configured to send browser-based application logic to the client devices that, when executed by the client devices, causes the client devices to perform said rendering, streaming, identifying, scheduling, and playing;

wherein the application server is further configured to send listings of assets in the asset repository to the client devices, the client devices configured to present the video editing interfaces for creating the media projects by accepting inputs selecting specific assets in the asset repository to include in the media projects;

a transaction server configured to conduct transactions with the client devices to sell licenses to purchasable assets in the plurality of assets;

a proxy server configured to relay media streams for third-party streaming media assets from one or more third-party servers to the client devices, the proxy server further configured to manipulate at least some of the relayed media streams.

22. A method comprising:

accessing, at a client device, project data describing a media project that associates assets with timespans in a project timeline, the assets including at least a first streaming media asset;

rendering, at the client device, video data for the media project, the assets being rendered during their associated timespans in the video data;

as the video data for the media project is being rendered, the client device streaming, from a network streaming source, first media for at least the first streaming media as set;

concurrently with the streaming and the rendering of the video data for the media project, playing the rendered video data in real-time at the client device;

identifying amounts of buffer time needed for buffering at least portions of media for particular streaming media assets, of the assets, prior to rendering particular timespans of video data associated with the particular streaming media assets, so as to ensure that the rendered video data is playable in real-time during said rendering;

scheduling times during the rendering to begin streaming media for the particular streaming media assets to buffers based on the identified amounts of buffer time and at least one of: a memory constraint, a bandwidth constraint, or a network constraint.

23. An apparatus comprising:

application logic, implemented at least partially by computing hardware, and configured to: access project data describing a media project that associates assets with timespans in a project timeline, the assets including at least a first streaming media asset;

a scheduler, implemented at least partially by computing hardware, and configured to: render video data for the media project, the assets being rendered during their associated timespans in the video data;

a streaming client, implemented at least partially by computing hardware, and configured to: as the video data for the media project is being rendered, stream, from a network streaming source, first media for at least the first streaming media asset;

a video player, implemented at least partially by computing hardware, and configured to: concurrently with the streaming and the rendering of the video data for the media project, play the rendered video data in real-time;

a scheduler, implemented at least partially by computing hardware, and configured to:

identify amounts of buffer time needed for buffering at least portions of media for particular streaming media assets, of the assets, prior to rendering particular timespans of video data associated with the particular streaming media assets, so as to ensure that the rendered video data is playable in real-time during said rendering; and schedule times during the rendering to begin streaming media for the particular streaming media assets to buffers based on the identified amounts of buffer time and at least one of: a memory constraint, a bandwidth constraint, or a network constraint.

24. The apparatus of claim 23, wherein the scheduler is further configured to identify a limit on a number of a streams that may be streamed to the client device concurrently;

wherein the scheduling comprises generating a schedule of the times to begin streaming media for the particular streaming media assets that avoids surpassing the limit on the number of the streams that may be streamed concurrently;

wherein the limit is a number of actively streaming media elements that may concurrently exist in a document object model for a document into which the video data is being rendered, wherein the scheduling further comprises scheduling times to add actively streaming media elements to the document object model and deactivate previously active streaming media elements.

25. The apparatus of claim 23, wherein at least a portion of the first streaming media asset is rendered concurrently within the video data with at least a portion of a second streaming media asset, the first media having been scheduled for streaming at a different time than second media for the second streaming media asset.

26. The apparatus of claim 23, wherein the scheduling comprises scheduling individual requests for discrete segments of two or more different media streams in alternation.

27. The apparatus of claim 23, wherein the scheduler is further configured to schedule a portion of the media project to be rendered in a non-real time manner into a media cache in advance of a time when that portion will be needed for playback.

* * * * *

UNITED STATES PATENT AND TRADEMARK OFFICE
CERTIFICATE OF CORRECTION

| | | |
|---|---|---|
| PATENT NO. | : 9,583,140 B1 | |
| APPLICATION NO. | : 14/876590 | |
| DATED | : February 28, 2017 | |
| INVENTOR(S) | : Bruce Rady | |

It is certified that error appears in the above-identified patent and that said Letters Patent is hereby corrected as shown below:

In the Claims

Column 51
Claim 1: Line 52: Delete "as set" and insert --asset--.

Column 55
Claim 22: Line 46: Delete "as set" and insert --asset--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*